United States Patent
Kunimatsu et al.

(10) Patent No.: US 7,861,624 B2
(45) Date of Patent: Jan. 4, 2011

(54) METHOD OF AND APPARATUS FOR WORKING STRUCTURE

(75) Inventors: Shinya Kunimatsu, Kyoto (JP); Hisayoshi Onishi, Kyoto (JP); Makoto Matsuo, Kyoto (JP)

(73) Assignee: Towa Corporation, Kyoto (JP)

( * ) Notice: Subject to any disclaimer, the term of this patent is extended or adjusted under 35 U.S.C. 154(b) by 567 days.

(21) Appl. No.: 11/984,768

(22) Filed: Nov. 21, 2007

(65) Prior Publication Data

US 2008/0121078 A1      May 29, 2008

(30) Foreign Application Priority Data

Nov. 24, 2006   (JP) ............................. 2006-317162

(51) Int. Cl.
  *B23B 3/00*   (2006.01)
  *B23B 7/00*   (2006.01)
(52) U.S. Cl. .......................................... 82/1.11; 82/117
(58) Field of Classification Search ................... 82/117, 82/1.11, 122, 129, 137, 149, 904; 29/27 C, 29/27 R, 33 R; 409/143, 145, 193, 64, 66, 409/69, 73; 83/13
See application file for complete search history.

(56) References Cited

U.S. PATENT DOCUMENTS

| | | | |
|---|---|---|---|
| 3,840,791 A | * | 10/1974 | Mack .......................... 318/571 |
| 5,396,821 A | | 3/1995 | Okumura et al. |
| 7,240,412 B2 | * | 7/2007 | Sasazawa et al. ........... 29/27 C |
| 7,506,423 B2 | * | 3/2009 | Iwabuchi et al. ............ 29/27 C |
| 2007/0095175 A1 | * | 5/2007 | Ostendarp ................... 82/1.11 |

FOREIGN PATENT DOCUMENTS

| | | |
|---|---|---|
| EP | 0979700 A2 | 2/2000 |
| JP | 7-241918 A | 9/1995 |
| JP | 2001-91718 A | 4/2001 |

OTHER PUBLICATIONS

Sornsuwit et al., The Japan Society of Mechanical Engineers, Series C, vol. 43, No. 1, 2000, pp. 164-169, XP-002472951.

* cited by examiner

*Primary Examiner*—Will Fridie, Jr.
(74) *Attorney, Agent, or Firm*—Birch, Stewart, Kolasch & Birch, LLP

(57) ABSTRACT

A mold material is mounted on a mold material mount portion of a cutting/working apparatus and rotated about the C-axis serving as the rotation center while a cutting tool is driven and moved in directions X and Y. Then, a desired position of the mold material is cut with the cutting tool at a relatively formed desired cutting speed and elliptically vibrated/cut with the cutting tool, for forming a Fresnel lens molding cavity having an opening of a desired shape and a working surface (concave surface, for example) of a desired shape. The productivity of an optical component mold employed as the structure can be efficiently improved when the mold for molding an optical component such as a Fresnel lens is worked by cutting the mold material employed as a workpiece with the cutting tool in a four-spindle lathe-type cutting/working apparatus including X-, Y-, Z- and C-axes of rotation.

14 Claims, 12 Drawing Sheets

CENTRAL POSITION OF
SPINDLE ROTATION O

METHOD OF AND APPARATUS FOR WORKING STRUCTURE

This nonprovisional application is based on Japanese Patent Application No. 2006-317162 filed with the Japan Patent Office on Nov. 24, 2006, the entire contents of which are hereby incorporated by reference.

BACKGROUND OF THE INVENTION

1. Field of the Invention

The present invention relates to a method of working a structure for working a workpiece into a structure having a cavity of a desired shape, and more particularly, it relates to a method of working an optical component mold (structure) for forming an optical component such as a Fresnel lens or an LED component by molding an optical element (electronic component) such as a light-emitting diode (LED) chip with a resin material such as silicone resin, for example.

2. Description of the Background Art

Working of a mold material with a conventional four-spindle lathe-type cutting/working apparatus is now described with reference to FIGS. 13A and 13B. In general, a lathe-type cutting/working apparatus 101 (four-spindle lathe-type cutting/working apparatus driven at least in four directions along the X-, Y-, Z-and C-axes, for example) is employed for working a mold material (workpiece) 102 with a cutting tool (turning tool) 103 such as a single-crystalline diamond tool thereby working an optical component mold (structure) for molding an optical component such as a Fresnel lens. This method is carried out in the following manner, for example:

First, mold material 102 is mounted on a mold material mount portion 104 of lathe-type cutting/working apparatus 101, and rotated about the C-axis (rotation center 105) of cutting/working apparatus 101 in a rotational direction (clockwise direction 109 in FIG. 13A). Then, mold material 102 is cut along center 105 forming the axis of rotation of rotated mold material 102 with cutting tool 103, thereby forming a Fresnel lens (optical component) molding cavity 106 having a circular opening and a working surface corresponding to the shape of the Fresnel lens on a work surface 107 of mold material 102.

At this time, a desired number of peripheral grooves each having a desired shape are formed on the working surface of cut cavity 106 concentrically with center 105 of the axis of rotation (C-axis), for forming mold material 102 (cavity part 108) having one cavity 106.

Therefore, a cavity block (split mold) having a desired number of cavities 106 is formed by aligning and combining the desired number of cavity parts 108 each having one cavity 106 with each other.

According to another working method employing cutting/working apparatus 101, mold material 102 is mounted on mold material mount portion 104 of cutting/working apparatus 101 and rotated about the C-axis of apparatus 101 as described above. Then, the steps of cutting one cavity 106 about rotation center 105 of mold material 101 with cutting tool 103 and thereafter moving (shifting) the worked position of worked mold material 102 are so repeated as to form a cavity block (split mold) having a desired number of cavities 106 by working the desired number of cavities 106 on mold material 102.

Such working of the mold material with the aforementioned conventional four-spindle lathe-type cutting/working apparatus is disclosed in FIG. 4 of Japanese Patent Laying-Open No. 07-241918 (1995) and description related thereto, for example.

The aforementioned working with lathe-type cutting/working apparatus 101 may be replaced with electron beam lithography. However, the electron beam lithography requires a considerable number of trials and errors in order to obtain optimum exposure distribution, and worked cavities 106 are small. Therefore, a mold formed by this lithography is so inferior in working efficiency that the same is not yet put into practice.

As hereinabove described, an optical component mold (split mold serving as a structure) for molding an optical component such as a Fresnel lens is generally worked with lathe-type cutting/working apparatus 101.

However, setup times are required for working a desired number (a large number) of cavity parts 108 (single cavities 106) respectively as hereinabove described, and a mold (split mold) having a desired number (a plurality) of cavities cannot be efficiently cut for efficiently manufacturing the optical component mold. Therefore, the productivity of the optical component mold (structure) cannot be efficiently improved.

When cavity parts 108 are aligned and combined with each other as described above, a step is easily formed on the combinational reference surface (work surface 107) of the formed cavity block. Therefore, a long time is required for flattening (flushing) this reference surface (107). Consequently, the productivity of the optical component mold (structure) cannot be efficiently improved in the working of (the working method for) the optical component mold.

Further, it is remarkably difficult to precisely arrange cavities 106 formed in mold material (workpiece) 102 at a desired pitch.

In the working of the optical component mold for molding an optical component such as a Fresnel lens, the working surface of the Fresnel lens must be mirror-finished, in order to improve the transparency of the lens or the reflectivity of a reflector.

In the aforementioned working, however, no sufficient desired cutting speed is obtained particularly in a case of cutting a hardly cuttable material such as cemented carbide, and hence working resistance is so increased that the working surface (concave surface, for example) cannot be mirror-finished.

In the case of working the optical component mold, therefore, the working surface formed on the mold cannot be efficiently mirror-finished, and a high-quality working surface cannot be efficiently worked.

In relation to the optical component mold (structure) for molding an optical component such as a Fresnel lens, further, working of an optical component molding cavity having an opening of a desired shape and a nonspherical working surface may be required, in addition to the cutting of cavity 106 having an axisymmetric circular opening and a spherical working surface (concave surface).

However, such a cavity cannot be efficiently worked in the aforementioned working method employing rotation center 105 as the axis of rotation. Thus, an optical component molding cavity having an opening of a desired shape and a nonspherical working surface cannot be efficiently worked in the working (method) of the optical component mold.

SUMMARY OF THE INVENTION

An object of the present invention is to efficiently improve the productivity of a structure by efficiently cutting a structure having a desired number (a plurality) of cavities in a method of working a structure.

Another object of the present invention is to efficiently work a high-quality working surface by efficiently mirror-finishing a working surface of a structure in working of a structure.

Still another object of the present invention is to efficiently work a cavity having an opening of a desired shape and a nonspherical working surface in working of a structure.

A further object of the present invention is to efficiently improve the productivity of an optical component mold by efficiently cutting a mold (split mold) having a desired number (a plurality) of cavities in working of an optical component mold.

A further object of the present invention is to efficiently work a high-quality working surface by efficiently mirror-finishing a working surface of a mold in working of an optical component mold.

A further object of the present invention is to efficiently work an optical component molding cavity having an opening of a desired shape and a nonspherical working surface in working of an optical component mold.

In order to solve the aforementioned technical problems, provided according to an aspect of the present invention is a method of working a structure with a working apparatus at least having three rectilinear drive spindles orthogonal to each other and a rotary spindle rotationally driving a workpiece by cutting the workpiece in a state rotated about a C-axis employed as the axis of rotation with a cutting tool driven in directions X and Y while relatively adjusting a desired depth of cut with respect to the workpiece in a direction Z thereby forming a cavity of a desired shape in the workpiece. This method comprises the steps of driving the cutting tool in the directions X and Y and synchronously rotating the cutting tool in the same rotational direction as the C-axis rotation, cutting a desired position of the workpiece with the cutting tool thereby forming the cavity of the desired shape in the workpiece and generating elliptical vibration on the cutting edge of the cutting tool thereby elliptically vibrating/cutting and working the workpiece at a relative desired cutting speed in the step of cutting the desired position of the workpiece with the cutting tool.

According to this method of working a structure, the desired cutting speed is relatively formed by a relative cutting feed rate resulting from the traveling speeds of the workpiece and the cutting tool and the vibration speed of the locus of the elliptical vibration in the step of cutting the workpiece with the cutting tool.

In order to solve the aforementioned technical problems, provided according to another aspect of the present invention is a method of working a structure with a working apparatus at least having three rectilinear drive spindles orthogonal to each other and a rotary spindle rotationally driving a workpiece by cutting the workpiece in a state rotated about a C-axis employed as the axis of rotation with a cutting tool driven in directions X and Y while relatively adjusting a desired depth of cut with respect to the workpiece in a direction Z thereby forming a cavity of a desired shape in the workpiece. This method comprises the steps of driving the cutting tool in the directions X and Y and synchronously rotating the cutting tool in the same rotational direction as the C-axis rotation, cutting a desired position of the workpiece with the cutting tool thereby forming the cavity of the desired shape in the workpiece and high-speed-milling the workpiece at a relative desired cutting speed in the step of cutting the desired position of the workpiece with the cutting tool.

According to this method of working a structure, the desired cutting speed is relatively formed by a relative cutting feed rate resulting from the traveling speeds of the workpiece and the rotated cutting tool and the rotational speed of a rotary blade in the step of cutting the desired position of the workpiece with the cutting tool.

According to this method of working a structure, the cutting edge of the cutting tool is arranged in the three o'clock direction in an opening of a molding cavity formed with the cutting tool in the step of cutting the desired position of the workpiece with the cutting tool.

In order to solve the aforementioned technical problems, an apparatus for working a structure according to still another aspect of the present invention comprises at least three rectilinear drive spindles orthogonal to each other, a rotary spindle rotationally driving a workpiece and a cutting tool driven in directions X and Y while relatively adjusting a desired depth of cut with respect to the workpiece in a direction Z, and the cutting tool is provided with an elliptical vibration generating portion generating a locus of elliptical vibration.

An apparatus for working a structure according to a further aspect of the present invention comprises at least three rectilinear drive spindles orthogonal to each other, a rotary spindle rotationally driving a workpiece and a cutting tool driven in directions X and Y while relatively adjusting a desired depth of cut with respect to the workpiece in a direction Z, and a rotary cutting tool for high-speed milling is provided as the cutting tool.

According to the present invention, a structure having a desired number (a plurality) of cavities can be efficiently cut and the productivity of the structure can be efficiently improved in the method of working a structure.

According to the present invention, a working surface of a structure can be efficiently mirror-finished and a high-quality working surface can be efficiently worked in working of a structure.

According to the present invention, a cavity including an opening having a desired shape and a nonspherical working surface can be efficiently worked in working of a structure.

According to the present invention, a mold (split mold) having a desired number of cavities can be efficiently cut and the productivity of an optical component mold can be efficiently improved in working of an optical component mold.

According to the present invention, a working surface of a mold can be efficiently mirror-finished and a high-quality working surface can be efficiently worked in working of an optical component mold.

According to the present invention, an optical component molding cavity including an opening having a desired shape and a nonspherical working surface can be efficiently worked in working of an optical component mold.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
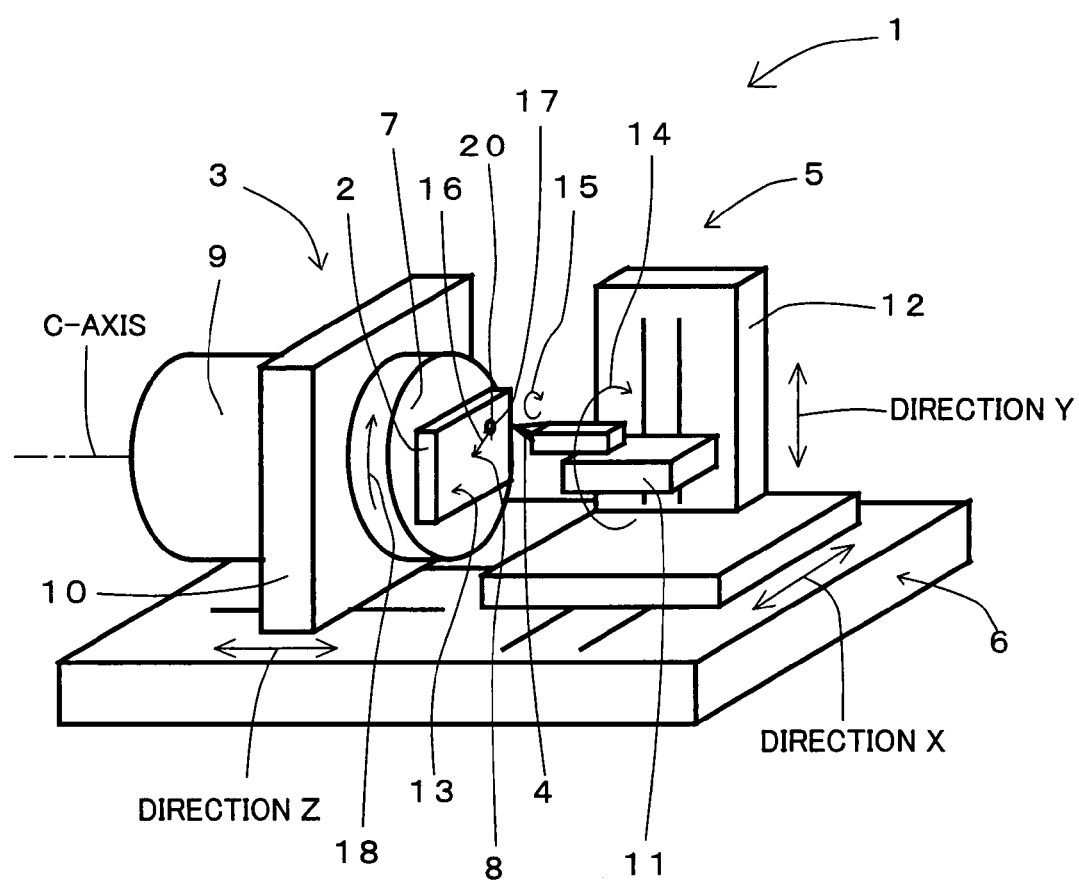
FIG. 1 is a schematic perspective view schematically showing a four-spindle lathe-type cutting/working apparatus according to an embodiment of the present invention.

The basic structures of an apparatus for working a structure and a working method employing the same according to each embodiment of the present invention are now described. According to the present invention, a working apparatus having three rectilinear drive spindles (X-, Y-and Z-axes, for example) orthogonal to each other and a rotary spindle (C-axis, for example) rotationally driving a mold material (workpiece) (and a numerical control unit driving these spindles) is employed. According to the present invention, an optical component mold (structure) resin-molding an optical component such as a Fresnel lens is worked by cutting a mold material with a cutting tool in a four-spindle lathe-type cutting/working apparatus driving the cutting tool at least in four directions along X-, Y-, Z-and C-axes, for example.

In the working method according to the present invention, a mold material (workpiece) is mounted on a mold material mount portion, which in turn is rotated clockwise, for example, about the C-axis serving as the rotation center, thereby rotating the mold material at a desired rotational speed.

At this time, a desired portion on the work surface of the mold material is rotated about the C-axis serving as the rotation center at a desired rotational speed (desired peripheral speed). At the same time, an arbitrary point of an opening of a cavity cut on a desired position at a desired distance from the rotation center of the C-axis is rotated/moved clockwise at a desired traveling speed along the locus of the mold material in the opening of the cavity correspondingly to the clockwise rotation of the mold material mount portion (see FIGS. 6A and 6B).

Then, the cutting edge of the cutting tool is aligned with the three o'clock position (cut position in the opening of the cavity) in the opening of the cavity cut on the aforementioned desired position of the rotated mold material. At the same time, the cutting tool is independently driven in directions X and Y respectively, so that the cutting edge of the cutting tool is aligned with the three-o'clock position in the opening of the rotated mold material.

At this time, the cutting edge of the cutting tool is approximated to (or separated from) the desired position (center) of the opening of the cavity from the outer peripheral edge of the opening for moving and cutting the opening of the cavity on the three-o'clock position. In other words, the cutting edge of the cutting tool moves along the locus (spiral locus, for example) of the cutting tool at a desired traveling speed.

On the three-o'clock position in the opening of the cavity, therefore, the arbitrary point (mold material) in the cavity opening regularly moves at a desired traveling speed while the cutting edge of the cutting tool also moves at a desired traveling speed. Thus, a relative desired cutting feed rate (cutting feed rate resulting from both moving loci) can be formed between the mold material and the cutting tool by the desired traveling speed (locus) of the mold material and the desired traveling speed (locus) of the cutting tool (synchronous control).

Figure 7A:
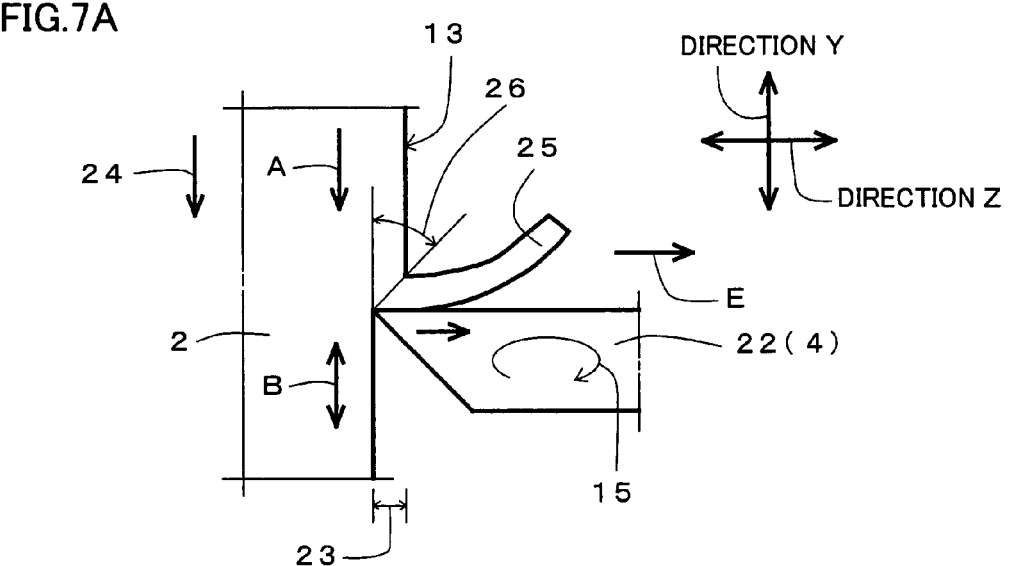
FIGS. 7A and 7B are a schematic enlarged front elevational view and a schematic enlarged perspective view schematically showing another principal part of the apparatus shown in FIG. 1 in an enlarged manner for illustrating a state of elliptically vibrating/cutting the mold material with the cutting tool.
Figure 7B:
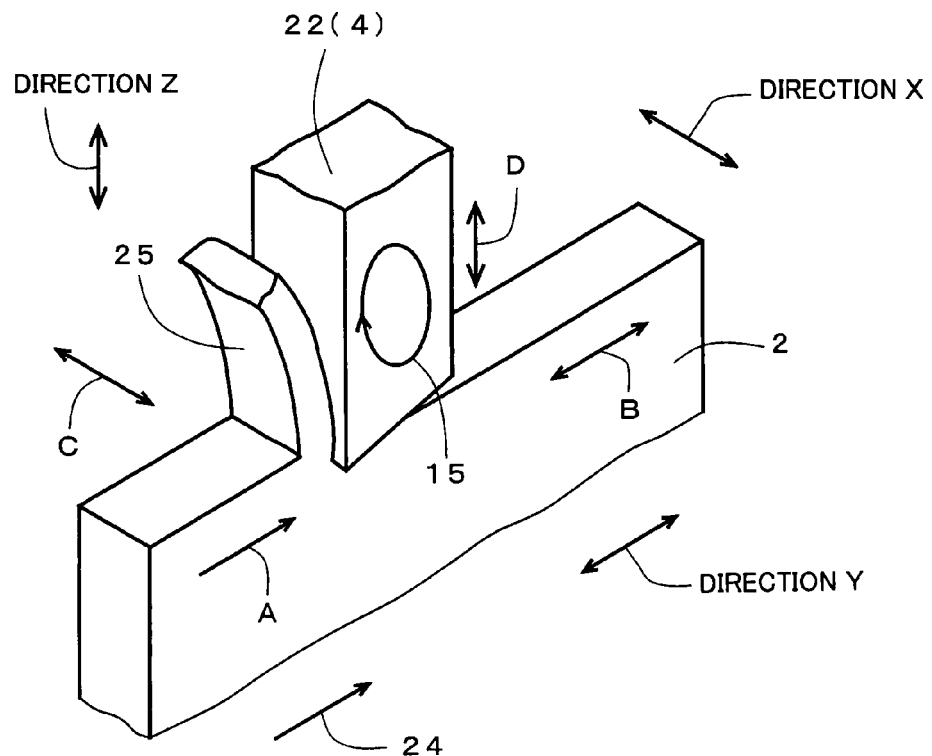

In other words, the desired cutting feed rate (moving locus) can be relatively formed by the desired traveling speed (desired rotational speed) in the mold material (workpiece) and the desired traveling speed in the cutting tool [as to the cutting feed rate, see arrow A (cutting direction) shown in FIGS. 7A and 7B].

In a working surface (concave surface, for example) of the cavity formed by cutting the work surface of the mold material, a desired depth of cut is adjusted by moving the mold material mount portion (mold material) or the cutting tool in direction Z.

Then, a locus (vibration locus) of elliptical vibration having a desired vibration speed is formed on the cutting edge of the cutting tool, and the cavity is elliptically vibrated/cut with the cutting edge of the cutting tool on a desired position separated from the rotation center of the C-axis in the rotated mold material by a desired distance.

At this time, the arbitrary point (cut position of the mold material) in the cavity opening regularly moves downward (clockwise) at the desired traveling speed (peripheral speed) on the three-o'clock position in the cavity opening, while the cutting in the locus of the elliptical vibration is directed upward (counterclockwise) oppositely to the downward movement of the mold material.

In other words, the "desired cutting speed (vibration locus)" according to the present invention can be relatively (and sufficiently) efficiently formed between the mold material and the cutting tool by the relative cutting feed rate resulting from the desired traveling speed (desired rotational speed) in the mold material (workpiece) and the desired traveling speed of the cutting tool and the desired vibration speed in the locus of the elliptical vibration.

Therefore, the working surface of the mold can be efficiently mirror-finished at the relative desired cutting speed (vibration locus) according to the present invention by cutting the mold material with the cutting tool while elliptically vibrating/cutting the mold material.

As hereinabove described, the cutting edge of the cutting tool can be moved along an arbitrary cutting tool locus by independently driving the cutting tool in directions X and Y respectively, whereby the cavity including the opening having the desired shape can be formed on the desired position of the work surface of the mold material separated from the rotation center by the desired distance.

As hereinabove described, further, the cavity including the desiredly shaped working surface can be formed by moving the mold material or the cutting tool in direction Z and relatively adjusting the same.

Therefore, an optical component molding cavity having a desired shape, i.e., an opening of a desired shape and a working surface (concave surface, for example) of a desired shape can be formed by cutting on a desired portion of a work surface of a mold material.

Further, a mold (split mold serving as a structure) having a desired number of cavities (structure obtained by arranging a plurality of cavities in the form of a matrix, for example) is cut by repeating the working according to the present invention for forming a desired number of cavities on a desired position of the mold material.

According to the aforementioned structure, therefore, a mold (split mold) having a desired number (a plurality) of cavities can be efficiently cut for efficiently improving the productivity of an optical component mold while a working surface of the mold can be efficiently mirror-finished for efficiently working a high-quality working surface in working of the optical component mold (structure).

As hereinabove described, a cavity having a desired shape can be formed in working of an optical component mold, whereby an optical component molding cavity including an opening of a desired shape and a nonspherical working surface can be efficiently worked.

A small cavity including an opening having a small diameter ($\phi$100 μm, for example) can be efficiently worked by minimally setting the locus of the elliptical vibration generated on the cutting edge of the cutting tool.

In other words, the said small cavity unworkable by general cutting can be efficiently worked according to the present invention.

When the cavity is cut on the desired position separated from the rotation center by the desired distance with a lathe-type cutting/working apparatus particularly in a hardly cuttable material such as cemented carbide, the following problem may arise: For example, the relative desired cutting feed rate (cutting speed) formed between the mold material and the cutting tool by the desired traveling speed (desired rotational speed) in (the desired position of) the mold material and the desired traveling speed of the cutting tool may be so insufficient that the working surface (concave surface, for example) cannot be mirror-finished due to increased working resistance.

However, the "desired cutting speed (vibration locus)" according to the present invention can be relatively (and sufficiently) efficiently formed between the mold material and the cutting tool by the relative cutting feed rate resulting from the desired traveling speed (desired rotational speed) in (the desired position of) the mold material and the desired traveling speed of the cutting tool and the desired vibration speed in the locus of the elliptical vibration.

Further, a substantial undeformed chip thickness per cycle of the locus of the elliptical vibration is reduced due to intermittent cutting resulting from the elliptical vibration cutting, whereby the working surface of the mold can be efficiently mirror-finished.

When cutting the mold material, therefore, the working surface of the mold can be efficiently mirror-finished and a high-quality working surface can be efficiently worked by elliptically vibrating/cutting the desired position of the mold material at the relative "desired cutting speed" according to the present invention.

In the aforementioned elliptical vibration, a rotational locus (rotational direction for cutting) of a rotary blade of a rotary cutting tool formed by high-speed milling can be employed in place of the locus of the elliptical vibration.

In other words, the desired cutting speed can be relatively formed by the relative cutting feed rate resulting from the desired traveling speeds of the mold material (workpiece) and the rotary cutting tool and a desired rotational speed of the rotary blade in this high-speed milling.

In this case, functions/effects similar to those of the aforementioned elliptical vibration structure can be attained.

Specific embodiments of the present invention are now described in detail with reference to the drawings.

First Embodiment

Figure 2A:
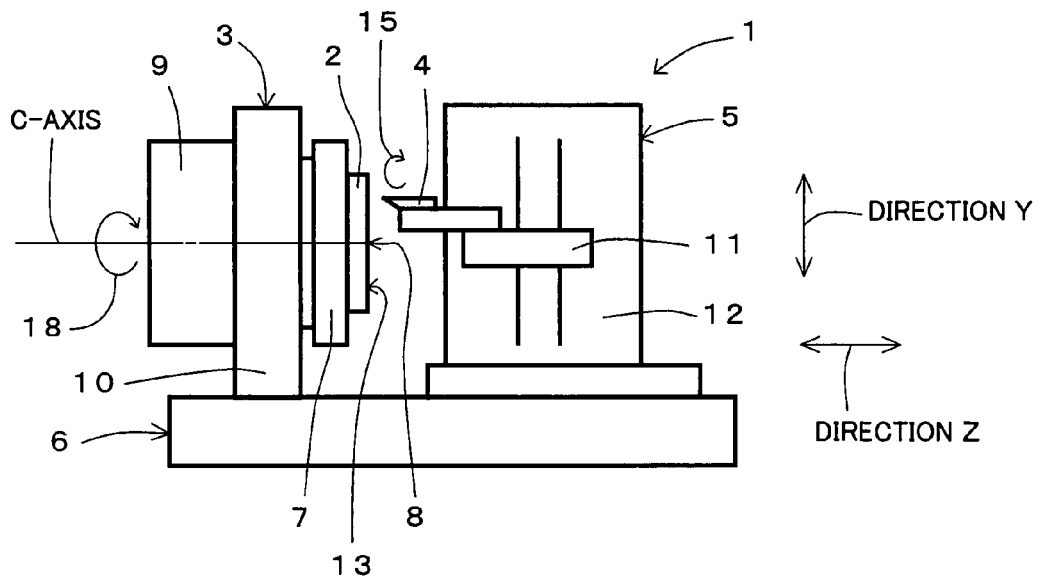
FIGS. 2A and 2B are a schematic front elevational view and a schematic plan view of the apparatus shown in FIG. 1 respectively.
Figure 2B:
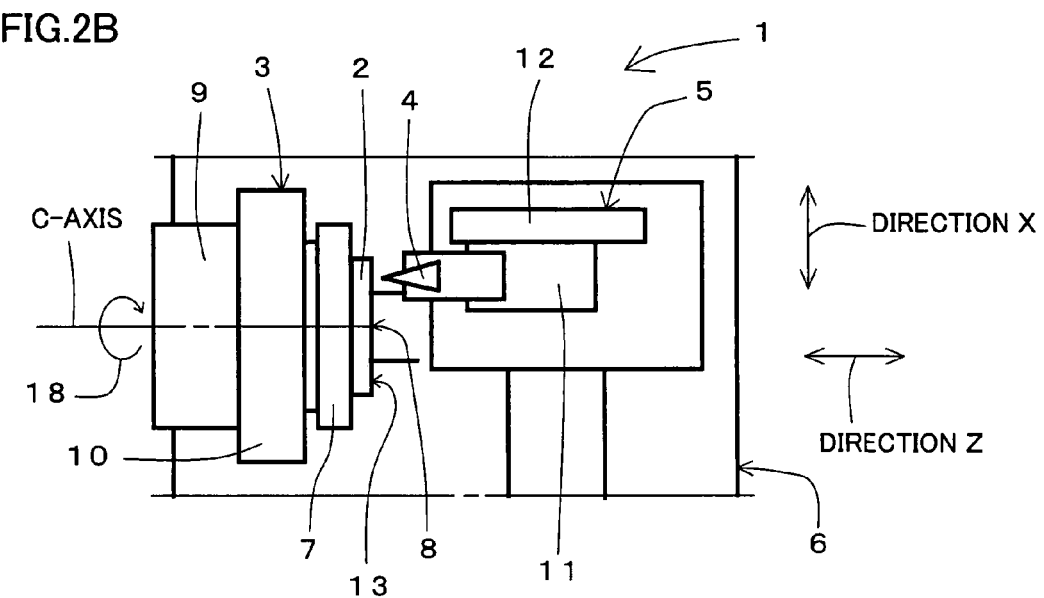

FIGS. 1, 2A and 2B show a four-spindle lathe-type cutting/working apparatus according to a first embodiment of the present invention. FIGS. 3A, 3B, 4A, 4B, 5, 6A, 6B, 7A and 7B show principal parts of the four-spindle lathe-type cutting/working apparatus according to the first embodiment of the present invention.

(Overall Structure of Lathe-Type Cutting/Working Apparatus)

The structure of a lathe-type cutting/working apparatus 1 according to the first embodiment of the present invention is described with reference to FIGS. 1, 2A and 2B.

As shown in FIGS. 1, 2A and 2B, lathe-type cutting/working apparatus 1 (four-spindle lathe-type cutting/working apparatus having X-, Y-, Z- and C-axes in FIGS. 1, 2A and 2B) according to the first embodiment of the present invention is provided with a mold material mount mechanism (workpiece mount mechanism) 3 mounted with a mold material (workpiece) 2 such as a steel material, a cutting tool mount mechanism 5 mounted with a cutting tool 4 such as a diamond tool and a base 6 for setting mold material mount mechanism 3 and cutting tool mount mechanism 5.

Therefore, mold material 2 mounted on mold material mount mechanism 3 can be cut with cutting tool 4 mounted on cutting tool mount mechanism 5 on base 6, for cutting a cavity 17 on a desired position 20 of a work surface 13 of mold material 2.

Cavity 17 includes an opening having a desired shape and a working surface (concave surface, for example) having a desired shape formed in this opening (desired range).

A control mechanism (numerical control unit, for example) (not shown) transmitting a control instruction (signal) described later to cutting/working apparatus 1 (mold material mount mechanism 3 and cutting tool mount mechanism 5, for example) and controlling the same is provided so that apparatus 1 can be synchronously controlled by this control mechanism.

Mold material mount mechanism 3 is provided with a mold material mount portion 7 mounted with mold material 2 through a proper member, a rotational driving portion (motor) 9 rotating mold material mount portion (workpiece mount portion) 7 mounted with mold material 2 in a desired direction about the C-axis formed by the rotation center (core) 8 of mold material 2 and a mold material mount mechanism body (workpiece mount mechanism body) 10 equipped with mold material mount portion 7 and rotational driving portion 9, while a Z-directional driving portion (not shown) driving body 10 in direction Z is provided on mold material mount mechanism body 10.

Therefore, mold material 2 mounted on mold material mount portion 7 can be rotated in the desired direction about rotation center 8 of the C-axis at a desired rotational speed (desired traveling speed) in mold material mount mechanism 3, and can be reciprocatively moved (in direction Z) with respect to cutting tool mount mechanism 5 (cutting tool 4) by driving mold material mount mechanism body 10 with the Z-directional driving portion.

The direction of the axis of rotation of the C-axis itself is identical (parallel) to direction Z, while mold material 2 (mold material mount portion 7) can be rotated in a right-handed (clockwise) rotational direction 18, for example, about the C-axis serving as rotation center 8 as viewed from the side of cutting tool 4 (cutting tool mount mechanism 5).

A desired portion (a locus 21 of a desired position 20 described later, for example) of mold material 2 is rotated about rotation center 8, to move at a desired rotational speed (desired traveling speed).

Cutting tool mount mechanism 5 is provided with a cutting tool mount portion 11 mounted with cutting tool 4, a cutting tool mount mechanism body 12 equipped with cutting tool mount portion 11, an X-directional driving portion (not shown) driving cutting tool mount portion 11 provided on body 12 in direction X, a Y-directional driving portion (not shown) driving cutting tool mount portion 11 provided on body 12 in direction Y and an elliptical vibration generating portion (not shown) provided on cutting tool mount portion 11 described later.

In other words, cutting tool 4 (mount portion 11) can be independently driven and moved in directions X and Y respectively in cutting tool mount mechanism 5.

Therefore, a cutting tool locus (spiral locus, for example) 14 having an arbitrary shape can be drawn on work surface 13 at a desired traveling speed with the forward end (cutting edge) of cutting tool 4 correspondingly to a cut position on work surface 13 of mold material 2 (to be clockwise identically to rotational direction 18 of mold material 2, for example).

Cutting tool locus 14 can be formed by performing cutting while regularly arranging the position of the cutting edge of cutting tool 4 on the same side as viewed from the central position of the opening in the opening (desired range) of cavity 17 formed in work surface 13 of mold material 2.

At this time, cutting tool locus 14 can be controlled by separating or approximating the cutting edge of cutting tool 4 from or to the central position of the opening.

In a circular opening, for example, cutting tool locus 14 can be formed by regularly arranging the cutting edge of cutting tool 4 on the three-o'clock position in the opening regarded as the face of a clock, while cutting tool locus 14 can be controlled by approximating the cutting edge of cutting tool 4 from a position on the outer peripheral edge of the circular opening toward the central position thereof, for example.

In cutting/working apparatus 1, directions X, Y and Z correspond to the horizontal direction, the vertical direction and the anteroposterior direction respectively with respect to mold material 2 mounted on mold material mount portion 7, while the direction of the C-axis (direction Z) is perpendicular to directions X and Y respectively.

In cutting/working apparatus 1, further, cutting tool 4 is longitudinal along direction Z, i.e., the direction of the depth of cut corresponding to the thickness direction of mold material 2, while an X-Y plane formed on the forward end (cutting edge) of cutting tool 4 independently moving in directions X and Y respectively is rendered parallel to work surface 13 of mold material 2.

In practice, work surface 13 is formed by previously turning mold material 2 before main working, for example, whereby the X-Y plane formed on the cutting edge of cutting tool 2 is parallel to work surface 13 of mold material 2.

The working surface (concave surface, for example) formed in the depth direction of the desired range (overall surface in the circular opening, for example) in the opening of cavity 17 including the desiredly shaped opening can be worked/forked by reciprocating the cutting edge of cutting tool 4 in direction Z.

Therefore, cavity 17 for molding an optical component (for molding a Fresnel lens, for example) including the desiredly shaped opening and the desiredly shaped working surface (concave surface or the like) can be formed on desired position 20 (at a desired distance 16 from rotation center 8) of work surface 13 in rotated mold material 2 with (the cutting edge of) cutting tool 4, as described later.

A locus 15 of the elliptical vibration generated on the cutting edge of cutting tool 4 by the elliptical vibration generating portion is formed on a Y-Z plane, as described later.

As hereinabove described, cutting tool locus 14 is formed on the cutting edge of cutting tool 4 due to the control instruction from the control mechanism of cutting/working apparatus 1 while a locus (locus 21 of desired position 20, for example) is formed on the cut position of work surface 13 of mold material 2 (mold material mount portion 7) due to the control instruction.

Therefore, a cutting speed (see arrow 24 shown in FIG. 7A) can be relatively formed between cutting tool 4 (locus 14) and mold material 2 (locus 21) due to the control instruction from the control mechanism of cutting/working apparatus 1.

(Cutting with Lathe-Type Cutting/Working Apparatus)

In lathe-type cutting/working apparatus 1, mold material 2 is first mounted on mold material mount portion 7 and rotated about rotation center 8 of the C-axis. Thus, mold material 2 (mold material mount portion 7) is rotated, and advanced toward cutting tool 4 (direction Z) with the Z-directional driving portion.

Then, the cutting edge of cutting tool 4 is moved along cutting tool locus 14 formed by the driving in directions X and Y at the desired traveling speed and adjusted to be reciprocative in the direction (direction Z) of the depth of cut corresponding to the thickness direction of mold material 2. Thus, desired position 20 separated from rotation center 8 by desired distance 16 can be cut on work surface 13 of rotated mold material 2.

At this time, elliptical vibration locus 15 is formed on the cutting edge of cutting tool 4 by the elliptical vibration generating portion as described above, whereby desired position 20 of work surface 13 of mold material 2 can be elliptically vibrated/cut, and cavity 17 for molding an optical component (for molding a Fresnel lens) including the desiredly shaped opening and the desiredly shaped working surface can be formed on desired position 20.

Figure 9:
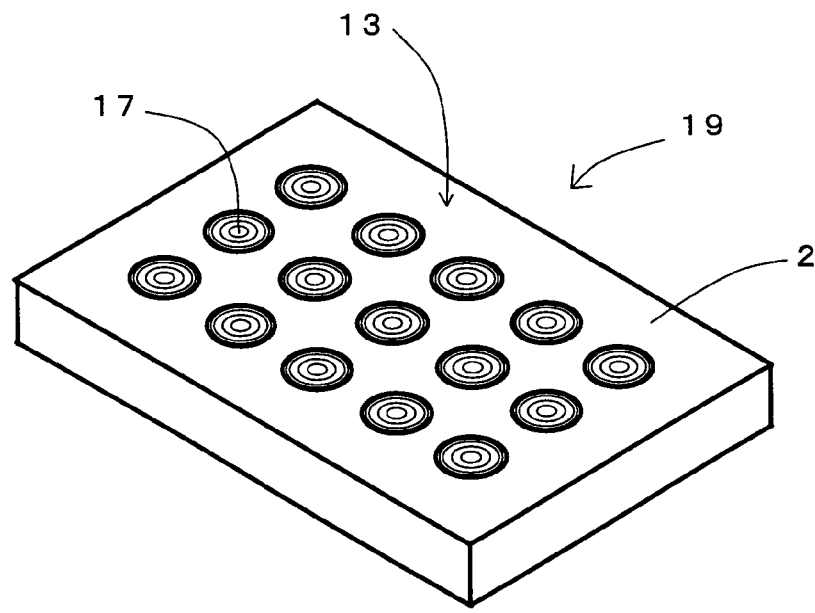
FIG. 9 is a schematic perspective view schematically showing the Fresnel lens mold (split mold) worked with the apparatus shown in FIG. 1.

Therefore, a desired number (a plurality) of Fresnel lens molding cavities 17 can be formed on work surface 13 of mold material 2, for obtaining a Fresnel lens mold (split mold 19) shown in FIG. 9.

The "desired cutting speed" (by the vibration locus according to the present invention) can be relatively (and sufficiently) efficiently formed between mold material 2 and cutting tool 4 by the relative cutting feed rate resulting from the desired traveling speed (desired rotational speed) in mold material 2 and the desired traveling speed in cutting tool 4 and the desired vibration speed on the locus (15) of the elliptical vibration on the three-o'clock position in the cavity opening in cutting of cavity 17, as described later.

(Cutting Tool Locus on Work Surface of Mold Material)

Figure 5:
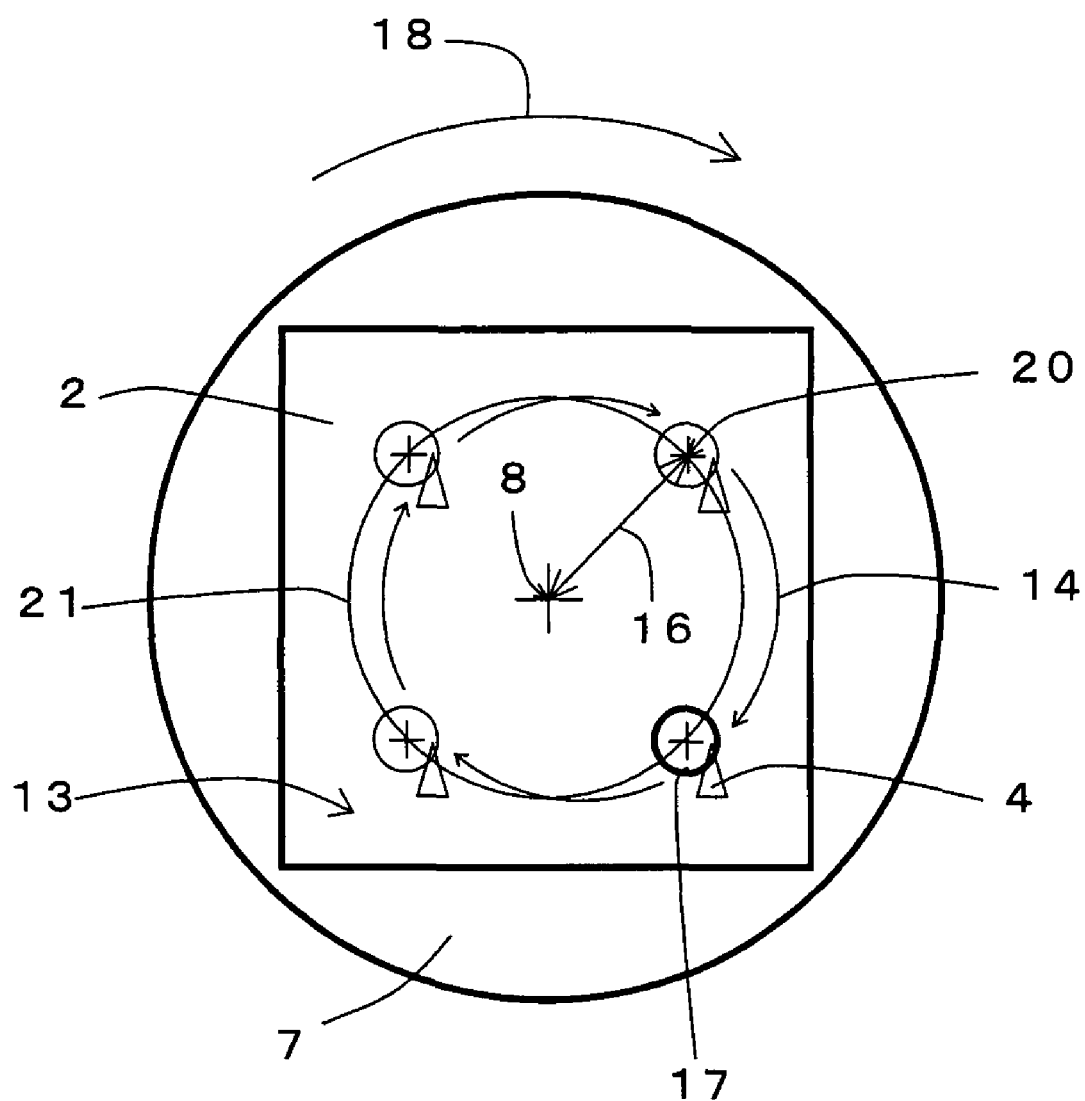
FIG. 5 is a schematic enlarged side elevational view schematically showing the principal part of the apparatus shown in FIG. 1 in an enlarged manner for schematically illustrating a locus of the forward end of a cutting tool on the work surface of the rotated mold material.

Cutting tool locus 14 is now described (refer to FIG. 5).

As hereinabove described, the forward end of cutting tool 4 can be independently moved in directions X and Y respectively in four-spindle lathe-type cutting/working apparatus 1, while the forward end (cutting edge) of cutting tool 4 can be (rotationally) moved at the desired traveling speed along cutting tool locus (spiral locus, for example) 14, as shown in FIG. 5.

According to this embodiment, the cutting edge of cutting tool 4 is located on the three-o'clock position in the cavity opening.

Referring to the position of an arbitrary point on work surface 13 of mold material 2 such as desired position 20 for cutting cavity 17, for example, desired position 20 is separated from the position of rotation center 8 of the C-axis on work surface 13 of mold material 2 by desired distance 16.

When mold material 2 mounted on mold material mount portion 7 is rotated about rotation center 8 of the C-axis, therefore, the arbitrary point on work surface 13 of rotated mold material 2 (rotationally) moves along locus 21 of a circle having a radius corresponding to desired distance 16 at the desired rotational speed (desired traveling speed or peripheral speed) while holding desired distance 16 between position 20 of the arbitrary point and the position of rotation center 8 as the radius.

In other words, the forward end of cutting tool 4 is rotated (clockwise or counterclockwise) in alignment with position 20 of the arbitrary point to be synchronized with position 20 of the arbitrary point and to follow the same, whereby the forward end (cutting edge) of cutting tool 4 can be rotationally moved along circular locus 14 having the radius corresponding to desired distance 16.

In the state of this rotation in alignment, therefore, position 20 of the arbitrary point on work surface 13 of rotated mold material 2 and the position of the forward end of rotated cutting tool 4 are in relatively stopped states.

In the state of this rotation in alignment (relatively stopped states), the cutting edge of cutting tool 4 is so arbitrarily moved with respect to mold material 2 (work surface 13) that the relative cutting feed rate (moving locus) can be formed between mold material 2 and cutting tool 4 by the desired traveling speeds (loci) of mold material 2 and cutting tool 4, as described later.

Cavity 17 having the desired shape can be formed on desired position 20 of work surface 13 of mold material 2 by cutting at the relative cutting feed rate (moving locus).

At this time, further, the desired cutting speed (vibration locus) can be relatively formed by the relative cutting feed rate resulting from the desired traveling speeds (loci) of mold material 2 and cutting tool 4 and the vibration speed of the locus of the elliptical vibration described later.

As hereinabove described, work surface 13 of mold material 2 can be cut with cutting tool 4 at the relatively formed desired cutting speed (24) by moving the cutting edge of cutting tool 4 from the position on the peripheral edge of the opening toward central position 20 thereof in the three o'clock direction in the opening of cavity 17 cut on desired position 20 of rotated mold material 2 (work surface 13), for example.

As hereinabove described, further, a working surface can be cut on work surface 13 by moving mold material 2 in direction Z thereby adjusting the depth of cut from work surface 13, for example.

Therefore, cavity 17 having the desiredly shaped opening and the desiredly shaped working surface can be cut on position 20 of the arbitrary point of work surface 13 of mold material 2 with the cutting edge of cutting tool 4 by synchronous control at the relative desired cutting speed (vibration locus) formed by the traveling speed (locus) of rotated mold material 2 and the vibration speed of the locus of the elliptical vibration including the cutting edge (locus) of moved cutting tool 4, as described later.

Figure 6A:
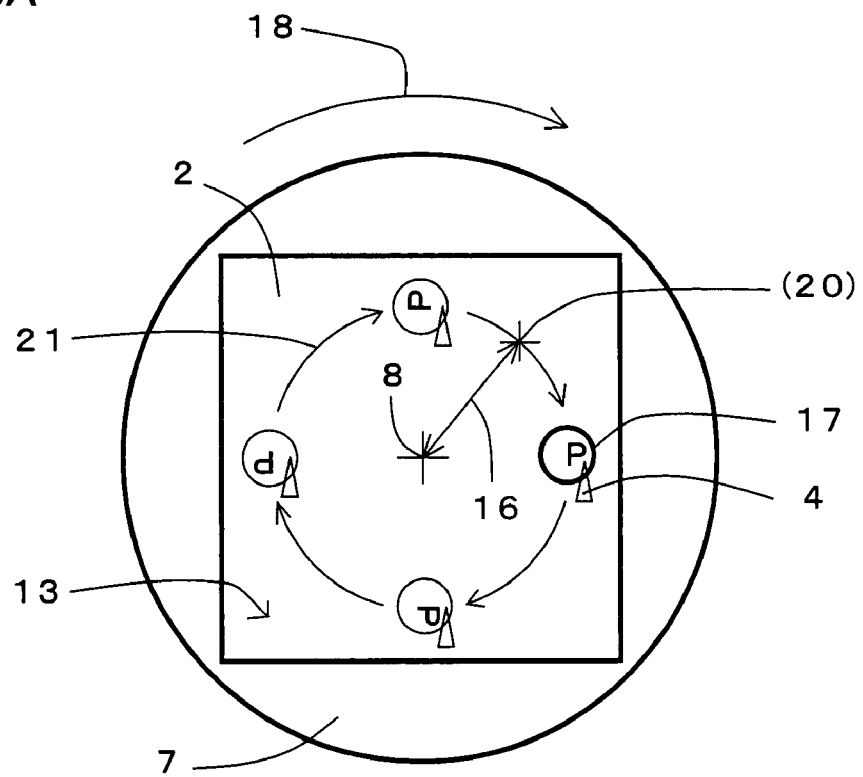
FIG. 6A is a schematic enlarged side elevational view schematically showing the principal part of the apparatus shown in FIG. 1 in an enlarged manner for illustrating states of a letter "P" shown on the work surface of the rotated mold material.
Figure 6B:
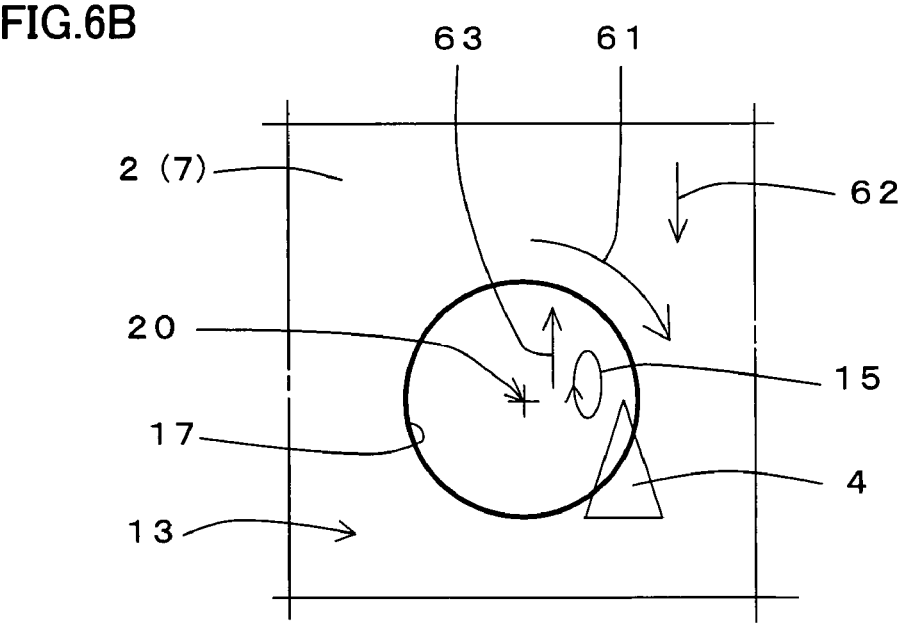
FIG. 6B is another schematic enlarged side elevational view schematically showing the principal part of the apparatus shown in FIG. 1 in an enlarged manner for illustrating an opening of a cavity cut on the work surface of the rotated mold material.

Referring to FIGS. 6A and 6B, the relative desired cutting feed rate formed on an arbitrary position in the opening (working surface) of molding cavity 17 formed on desired position 20 of work surface 13 of rotated mold material 2 (mold material mount portion 7) separated from rotation center 8 by desired distance 16, for example, is now described with reference to an alphabetic letter P in the opening of cavity 17 shown in FIG. 6A and the opening of cavity 17 shown in FIG. 6B (synchronous control).

For example, alphabetic letter P located on the three o'clock position on work surface 13, regarded as the face of a clock, of mold material 2 mounted on mold material mount portion 7 is successively rotated clockwise upon clockwise rotation (in right-handed rotational direction 18) of mold material mount portion 7 to be inverted on the nine-o'clock position of mold material 2, for example, as shown in FIG. 6A.

In other words, letter P itself is so successively rotated clockwise that arbitrary positions on the outer peripheral edge (circumference) of and in the opening of cavity 17, for example, are also rotated clockwise, as shown in FIG. 6A.

Therefore, a (rotational) traveling direction 61 resulting from the rotation of mold material 2 (mold material mount portion 7) about rotation center 8 in right-handed rotational direction 18 on the three o'clock position in the opening of cavity 17 (rotationally) moved on work surface 13 is regularly downward (shown by arrow 62) in the example shown in FIG. 6A.

As shown in FIG. 6A, a desired position (cut position) of the cutting edge (upper point of triangular cutting tool 4) of cutting tool 4 is regularly located on the three-o'clock position in the opening of cavity 17 regarded as the face of a clock, while this three-o'clock position is located rightward beyond central position 20 of the opening of cavity 17 regardless of (rotational) movement of cavity 17.

In other words, the cutting edge of cutting tool 4 present on the desired position of the opening in the three-o'clock direction forms cutting tool locus 14 at the desired traveling speed.

Therefore, the relative cutting feed rate (moving locus) can be obtained by traveling directions 61 and 62 (desired traveling speed) of mold material 2 and locus 14 (desired traveling speed) of cutting tool 4.

Further, the direction of cutting resulting from locus 15 of the elliptical vibration generated on cutting tool 4 with respect to mold material 2 (work surface 13) is regularly upward (shown by arrow 63) in FIG. 6B, as described later.

Therefore, the desired cutting speed (vibration locus) can be relatively formed by the relative cutting feed rate resulting from traveling directions 61 and 62 (desired traveling speed) of mold material 2 and locus 14 (desired traveling speed) of cutting tool 4 and direction 63 (desired vibration speed) of the cutting resulting from elliptical vibration locus 15 in the three-o'clock direction in the opening of cavity 17, as described later.

While the cut position (position for setting the cutting edge of cutting tool 4) in the opening of cavity 17 can alternatively be regularly set on an arbitrary position such as the six-, nine-or twelve-o'clock position, cutting tool 4 must be so arranged that the direction (63) of the cutting along elliptical vibration locus 15 is opposite to right-handed rotational direction 18 of mold material 2 (mold material mount portion 7).

In extreme terms, the arbitrary point (position for cutting mold material 2) in the opening of cavity 17 is regularly rotated clockwise in this opening, and the "desired cutting speed (vibration locus)" according to the present invention can be relatively formed between mold material 2 and cutting tool 4 by arranging the direction of the cutting along elliptical vibration locus 15 so that the cutting edge of cutting tool 4 is opposite to the traveling direction of the arbitrary point in the opening.

(Elliptical Vibration Cutting)

Elliptical vibration cutting is now described with reference to FIGS. 7A and 7B.

As hereinabove described, cutting tool mount portion 11 is provided with the elliptical vibration generating portion (not shown) forming and drawing elliptical vibration locus 15 on the forward end (cutting edge) of cutting tool 4 mounted on cutting tool mount portion 11.

Therefore, work surface 13 of mold material 2 can be elliptically vibrated/cut by forming elliptical vibration locus 15 mechanically resonated/composited by vibrations in directions Y and Z on the plane formed in directions Y and Z in the elliptical vibration generating portion.

The principle of elliptical vibration cutting is now described with reference to a cutting tool 22 (4) so shaped as to clearly illustrate this principle.

In elliptical vibration cutting, a workpiece (mold material) is elliptically vibrated/cut by a desired undeformed chip thickness 23 with cutting tool 22 (4) in an elliptical vibration state.

The elliptical vibration generating portion includes piezoelectric elements (not shown) individually vibrating the cutting edge of cutting tool 22 (4) in directions Y and Z respectively, for example, and the piezoelectric elements for generating vibrations in the two directions Y and Z are so formed that a prescribed sinusoidal voltage can be individually input therein at a prescribed frequency (ultrasonic domain, for example) and a prescribed phase difference (90°, for example) respectively, for example.

Therefore, elliptical vibration locus 15 having a desired cycle (ultrasonic domain around 20 KHz, for example) can be formed on the cutting edge of cutting tool 22 (4) at the "desired vibration speed" by individually inputting the prescribed sinusoidal voltage in the respective piezoelectric elements thereby mechanically resonating/compositing the vibrations generated in the two directions Y and Z.

Direction Y corresponds to a cutting direction A and a cutting force direction B, direction Z corresponds to a thrust force direction D, and direction X corresponds to a feed force direction C.

Further, the direction of (relative desired) cutting speed 24 in mold material 2 is identical to cutting direction A.

First, the workpiece (mold material 2) is cut with cutting tool 22 (4) in cutting force direction B (upward in FIG. 7A) along elliptical vibration locus 15.

Upward cutting force direction B shown in FIG. 7A defines the cutting direction (63) in elliptical vibration locus 15.

Then, cutting tool 22 (4) is separated from workpiece 2 in thrust force direction D (rightward in FIG. 7A).

At this time, cutting tool 22 (4) pulls up a chip 25 cut off from workpiece 2 in thrust force direction D (rightward in FIG. 7A) thereby discharging chip 25 in a chip discharge direction E, whereby frictional resistance against elliptical vibration cutting is reduced or inverted (to negative frictional resistance) as compared with ordinary cutting.

In other words, cutting resistance of workpiece 2 against cutting tool 22 (4) is reduced, while cutting force of cutting tool 22 (4) can be reduced for improving machinability.

Then, cutting tool 22 (4) is separated from chip 25 in cutting force direction B (downward in FIG. 7A) (rightward in FIG. 7B), and moved in thrust force direction D (leftward in FIG. 7A), i.e., toward workpiece 2.

Therefore, workpiece 2 can be elliptically vibrated/cut and worked by periodically vibrating cutting tool 22 (4) along elliptical vibration locus 15.

The aforementioned elliptical vibration cutting has such advantages that the thickness (23) of chip 25 is reduced as compared with ordinary cutting, cutting resistance can be reduced while the working surface can be mirror-finished, the life of cutting tool 22 (4) is increased, precision in the worked shape is improved, formation of mold flashes is suppressed, chattering vibration is prevented, and cutting heat is reduced.

According to a conventional cutting method, workpiece 2 is cut with cutting tool 22 (4) in a compressed state, whereby cutting resistance is increased and chip 25 is compressed into powder to form mold flashes on the cut surface of workpiece 2.

In the elliptical vibration cutting, however, cutting tool 22 (4) can pull up chip 25, whereby a shear angle is increased, cutting resistance is reduced, chip 25 can be continuously formed (in an elongated shape, for example) to be discharged (referred to as a continuous ductility mode), formation of mold flashes can be suppressed, and the cut surface of workpiece (mold material) 2 can be mirror-finished.

Numeral 26 denotes the shear angle.

(Structure of Compression Mold Comprising Split Mold)

Figure 10:
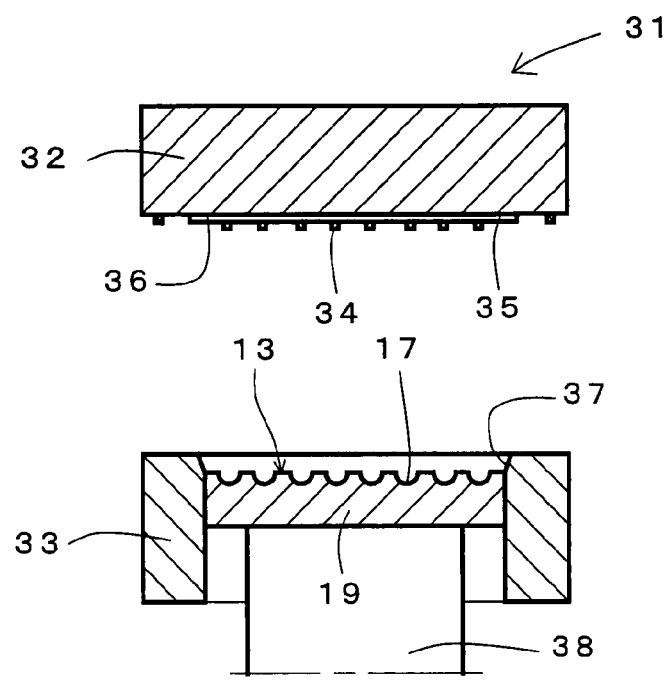
FIG. 10 is a schematic sectional view schematically showing a compression mold comprising the Fresnel lens mold (split mold) shown in FIG. 9.

The structure of a compression mold (optical component mold) 31 detachably comprising split mold 19 (see FIG. 9) having a desired number of Fresnel lens molding cavities 17 is now described with reference to FIG. 10.

Compression mold (Fresnel lens mold) 31 comprising split mold 19 is constituted of an upper mold section 32 and a lower mold section 33, for example, while a substrate supply portion 36 supplying/setting a substrate 35 mounted with optical elements (electronic components) 34 such as LEDs is provided on upper mold section 32.

Lower mold section 33 is provided with a general cavity 37 collectively compression-molding optical elements 34 mounted on substrate 35, while split mold 19 (see FIG. 9) provided with discrete cavities (cavities) 17 corresponding to optical elements 34 respectively is detachably provided in general cavity 37.

Lower mold section 33 is further provided with a pressing member 38 pressing a resin material heated/melted in general cavity 37 (cavities 17) through split mold 19.

Therefore, optical elements 34 can be individually compression-molded in cavities 17 of general cavity 37 by dipping optical elements 34 mounted on substrate 35 supplied to substrate supply portion 36 of upper mold section 32 into the resin material heated/melted in general cavity 37 and pressing the resin material in general cavity 37 with pressing member 38.

A work surface 13 of split mold 19 defines the bottom surface of general cavity 37 in mold 31 (lower mold section 33).

(Elliptical Vibration Cutting of Cavity)

In other words, compression mold 31 (refer to FIG. 10) comprising split mold 19 (refer to FIG. 9) having cavities 17 for molding a desired number of Fresnel lenses, for example, can be formed by elliptically vibrating/cutting desired position 20 of work surface 13 of mold material (workpiece) 2 with cutting tool 22 (4).

Further, formation of mold flashes can be efficiently prevented in Fresnel lens molding cavities 17 (Fresnel lens molding surfaces) by the elliptical vibration cutting as compared with ordinary cutting, and the Fresnel lens molding surfaces can be efficiently mirror-finished by the elliptical vibration cutting.

In other words, mold 31 (split mold 19) capable of resin-molding resin Fresnel lenses (plastic Fresnel lenses) improvable in light transmission property can be worked by forming the Fresnel lens molding surfaces through elliptical vibration cutting of mold material 2.

Therefore, split mold 19 comprising the Fresnel lens molding surfaces is detachably mounted on compression mold (31) shown in FIG. 10 so that resin Fresnel lenses can be compression-molded with mold (31), as described later.

In other words, the Fresnel lens molding surfaces (mirror surfaces) can be transferred to resin Fresnel lens surfaces, thereby mirror-finishing the resin Fresnel lens surfaces forming the transferred surfaces.

The resin Fresnel lens surfaces are so mirror-finished as to eliminate a factor inhibiting light passing through the resin Fresnel lens surfaces by transfer of mold flashes in the aforementioned prior art, whereby the light transmission property on the resin Fresnel lens surfaces can be improved.

Therefore, the light transmission property can be improved in the entire resin Fresnel lenses formed by mold 31 elliptically vibrated/cut as compared with resin Fresnel lenses formed by a mold worked by the conventional cutting method.

(Working of Peripheral Groove in Fresnel Lens Mold)

Working of peripheral grooves formed in Fresnel lens mold 31 is now described with reference to FIGS. 8A and 8B.

Figure 8A:
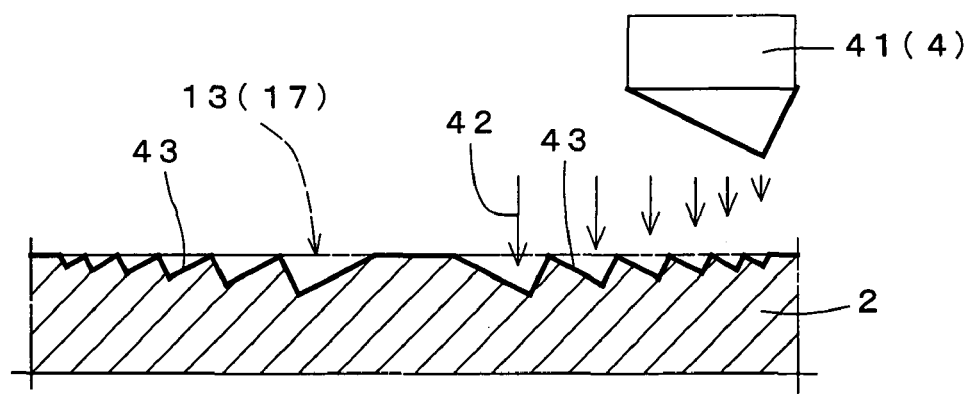
FIGS. 8A and 8B are longitudinal sectional views each schematically showing the mold material shown in FIG. 1 in an enlarged manner for illustrating a state of working a Fresnel lens mold.
Figure 8B:
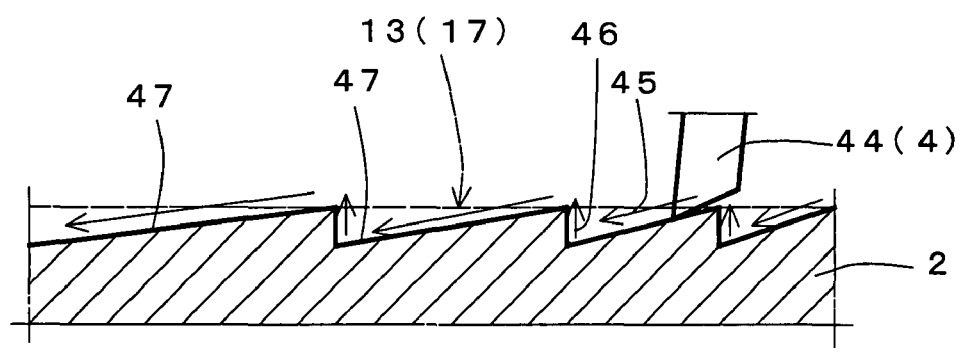

FIGS. 8A and 8B show mold material 2 (section) having peripheral grooves 43 and 47 formed by cutting tools 41 and 44 (4) respectively. The Y-Z plane on which elliptical vibration locus 15 is formed is perpendicular to the horizontal planes shown in FIGS. 8A and 8B.

Referring to FIGS. 8A and 8B, arrows show movements of cutting tools 41 and 44 (4) in cutting.

Peripheral grooves 43 and 47 of mold 31 are transferred to the resin Fresnel lenses in an inverted manner.

In the example shown in FIG. 8A, cutting tool 41 (4) including a cutting edge having a shape similar to that of peripheral grooves 43 in section is employed.

When mold material 2 is cut with cutting tool 41 (4) at a relative desired cutting speed as shown in FIG. 8A, for example, peripheral grooves 43 having a desired depth (direction Z) can be cut by a desired number correspondingly to the shape of the cutting edge of cutting tool 41 (4) individually and successively stepwise in the similar shape.

At this time, elliptical vibration (locus 15) is applied to the cutting edge of cutting tool 41 (4), so that peripheral grooves 43 can be elliptically vibrated/cut.

When the Fresnel lens mold is worked, therefore, cutting resistance is reduced, chips can be continuously formed and discharged, formation of flashes can be suppressed and peripheral grooves 43 of mold material 2 can be mirror-finished, as hereinabove described.

Referring to FIG. 8B, on the other hand, cutting tool 44 (4) is employed.

When mold material 2 is cut with cutting tool 44 (4) at a relative desired cutting speed as shown in FIG. 8B, for example, peripheral grooves 47 can be individually and successively cut stepwise in two stages along leftward arrow 45 and upward arrow 46 shown in FIG. 8B.

At this time, elliptical vibration (locus 15) is applied to the cutting edge of cutting tool 44 (4), so that peripheral grooves 47 can be elliptically vibrated/cut.

Therefore, peripheral grooves 47 of mold material 2 can be mirror-finished with cutting tool 44 shown in FIG. 8B through a function/effect similar to that in FIG. 8A.

Referring to FIGS. 8A and 8B, surfaces (curved surfaces) of cavities 17 for forming peripheral grooves 43 and 47 may be formed by the elliptical vibration cutting according to the present invention before cutting peripheral grooves 43 and 47.

(Calculation of Locus of Cutting Tool and Control Instruction in Working of Fresnel Lens Mold)

An exemplary calculation (control instruction) of the locus of cutting tool 4 is now described with reference to FIG. 11.

Four-spindle lathe-type cutting/working apparatus 1 shown in FIG. 1 is employed in the present invention as hereinabove described, while a position $O_j$ (desired position 20) separated from the core O (rotation center 8) of the C-axis by a radius $R_j$ (desired distance 16) is set in rectangular coordinates (X, Y, Z) with reference to the origin formed by the core O (central position of spindle rotation) of the C-axis.

In other words, the shape of the opening of Fresnel lens mold cavity 17 located on position $O_j$ of mold material 2 (mold material mount portion 7) separated from core O (rotation center 8) of the C-axis by desired distance $R_j$ (16) is expressed as follows:

$$Z(r_j) = \text{mod}[f(r_j), b] \tag{1}$$

$$f(r_j) = \frac{C_v r_j^2}{1 + \sqrt{1 - C_v^2(1 + C_c)r_j^2}} + \sum_{i=3}^{m} C_i r_j^i \tag{2}$$

$$r_j^2 = (X - Xo_j)^2 + (Y - Yo_j)^2, \; j = 0, 1, 2, \ldots n \tag{3}$$

Referring to the expressions (1), (2) and (3), x, y and z denote the coordinates of mold material (workpiece) 2 in directions X, Y and Z respectively. b denotes a step, $r_j$ denotes the distance from the lens center, i denotes an order, j denotes the number of each lens, and ($Xo_j$, $Yo_j$) denotes the central coordinates of the lens. $C_v$ denotes approximate curvature, $C_c$ denotes a coefficient of cone, and $C_j$ denotes a working point of each lens, wherein approximate curvature $C_v$ is equal to 1/R (R: approximate radius of curvature). All of these constants stand for those of the configuration of the original aspheric lens having the shape of Fresnel lens.

Figure 11:
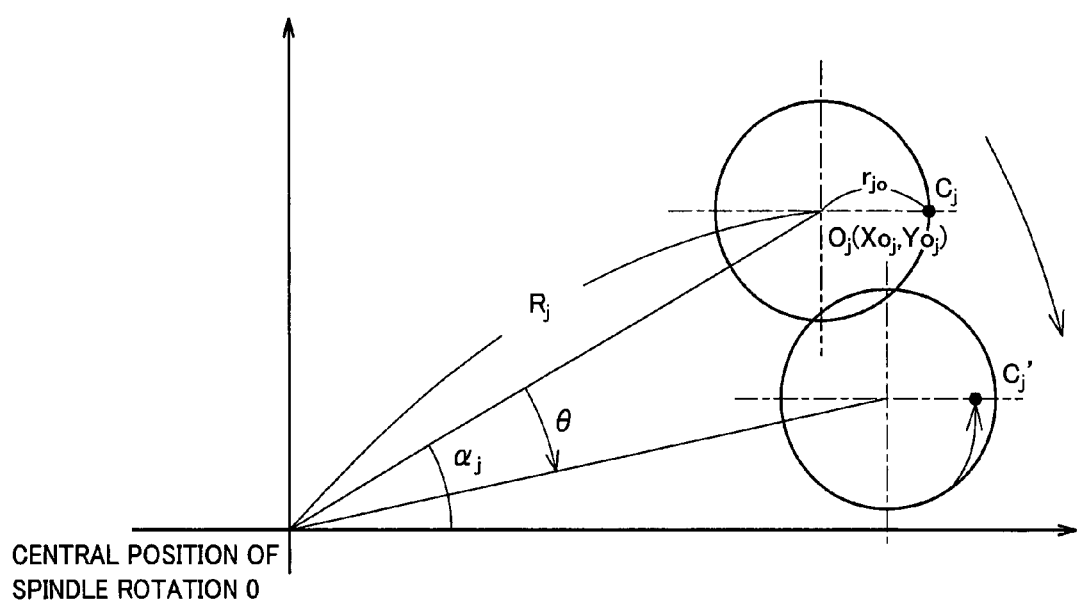
FIG. 11 is a schematic side elevational view schematically showing the work surface of the mold material mounted on the apparatus shown in FIG. 1 for illustrating the position of a Fresnel lens molding cavity on the work surface.

Assuming that ($Xo_j$, $Yo_j$) denotes the central coordinates of the lens j as shown in FIG. 11, polar coordinates ($R_j$, $\alpha_j$) can be expressed as follows:

$$R_j = \sqrt{Xo_j^2 + Yo_j^2} \quad (4)$$

$$\alpha_j = \tan^{-1}\frac{Yo_j}{Xo_j} \quad (5)$$

Assuming that θ represents the rotation angle (degrees) at core O (rotation center 8) of the C-axis of mold material 2 (mold material mount portion 7), T represents the rotational speed (rpm) of the C-axis, $r_o$ represents the radius of lens j and F represents the relative feed rate (mm/min.) of cutting tool 4 on lens j, polar coordinates ($r_j$, $\theta_j$) showing the position of the cutting edge of cutting tool 4 with reference to center $O_j$ (desired position 20) of lens j is expressed as follows:

$$(r_j, \theta_j) = \left(r_{j0} - \frac{F}{T}\cdot\theta, \frac{\pi\theta}{180}\right) \quad (6)$$

Therefore, position coordinates instructed and transmitted as the control instruction from the control mechanism to four-spindle lathe-type cutting/working apparatus 1 according to this embodiment are expressed as follows:

$$X: R_j\cdot\cos(\alpha_j-\theta_j)+r_j \quad (7)$$

$$Y: R_j\cdot\sin(\alpha_j-\theta_j) \quad (8)$$

$$Z: Z(r_j) \quad (9)$$

$$C: \theta \quad (10)$$

Referring to FIG. 11, points $C_j$, $C_j'$ in the two circle respectively denote working points, and the arrow in the lower circle (showing the shape of the opening of cavity 17) shows the locus of the cutting edge of cutting tool 4. In this case, the cutting edge of cutting tool 4 is regularly set on the three-o'clock position in the circular opening of cavity 17 (regarded as the face of a clock), for example.

Split mold 19 can be formed by repeating the aforementioned working with the control instruction by the number n of the lenses thereby forming the desired number of Fresnel lens mold cavities 17 on mold material 2 (work surface 13).

(Shape of Opening in Cavity and Shape of Working Surface)

The case of elliptically vibrating/cutting cavity 17 of the desired shape with lathe-type cutting/working apparatus 1 capable of forming elliptical vibration locus 15 on the cutting edge of cutting tool 4 (41, 44) at the "desired vibration speed" as hereinabove described is now described.

First, the desired control instruction is transmitted to apparatus 1, for rotating mold material 2 (mold material mount portion 7) and moving the same to the desired position (20) at the desired distance (16) from rotation center 8 along locus 21 at the "desired traveling speed", while moving the cutting edge of cutting tool 4 (41, 44) along cutting tool locus 14 at the "desired traveling speed".

Then, desired position 20 of work surface 13 of rotated mold material 2 is elliptically vibrated/cut with cutting tool 4 (41, 44), so that (single) cavity 17 having the desiredly shaped opening can be formed on desired position 20 of mold material 2 and cavity 17 has the working surface (concave surface, for example) of the desired shape.

At this time, the "desired cutting speed (vibration locus)" according to the present invention is relatively formed by the relative cutting feed rate resulting from the desired traveling speeds of mold material 2 and cutting tool 4 (41, 44) and the vibration speed of elliptical vibration locus 15.

In other words, the opening of cavity 17 can be formed in an arbitrary shape on work surface 13, while the working surface (concave surface) of cavity 17 can also be formed in an arbitrary shape according to this embodiment.

For example, the opening of cavity 17 can be circularly or elliptically formed, while the working surface of cavity 17 can be worked into a desired curved shape, a nonspherical shape, a curved shape having concentric peripheral grooves (43, 47) or the like. Thus, the opening and the working surface of cavity 17 can be worked into various shapes.

When the interval between the centers of cavities 17 is reduced below the diameter of the opening of cavity 17, a complicated shape can be formed by superposing the aforementioned shapes.

(Function)

According to this embodiment, as hereinabove described, cavity 17 having the desiredly shaped opening and the desiredly shaped working surface can be cut on the desired position (arbitrary position) of moved work surface 13 (mold material 2) by elliptical vibration (locus 15) with moved cutting tool 4 at the relative desired cutting speed (24), thereby obtaining split mold (optical component mold) 19 having the desired number of cavities 17.

In other words, mold material 2 may simply be mounted on mold material mount portion 7 once according to this embodiment, whereby cavity parts 108 may not be worked one by one and mold material 102 may not be shifted for working each cavity 106 dissimilarly to the prior art.

Therefore, neither setup time of the apparatus nor assembly time for the cavity block is necessary, whereby the mold can be manufactured in a shorter time than the prior art so that the productivity of the optical component mold can be efficiently improved.

According to this embodiment, mold material 2 can be cut with cutting tool 4 at the relative desired cutting speed while the working surface of cavity 17 can be elliptically vibrated/cut, whereby the working surface of the mold can be mirror-finished.

Therefore, a high-quality working surface can be efficiently worked in working of the optical component mold according to the present invention.

While only cavity 106 having the axisymmetric circular opening and the spherical working surface is worked at rotation center 105 in the prior art, cavity 17 including the desiredly shaped opening and the desiredly shaped working surface is formed on desired position 20 of mold material 2 separated from rotation center 8 by desired distance 16 according to the present invention, whereby cavity 17 including the desiredly shaped opening and the nonspherical working surface (concave surface) can be efficiently worked.

(Method of Working Optical Component Mold)

Figure 3A:
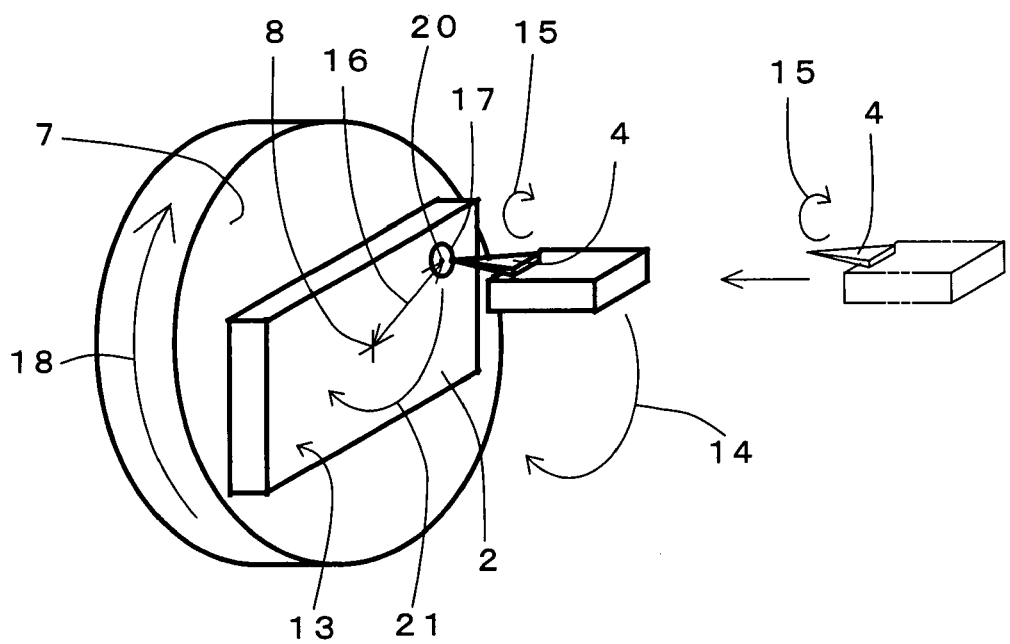
FIGS. 3A and 3B are schematic enlarged perspective views schematically showing a principal part of the apparatus shown in FIG. 1 in an enlarged manner for illustrating a state of cutting a work surface of a rotated mold material.
Figure 3B:
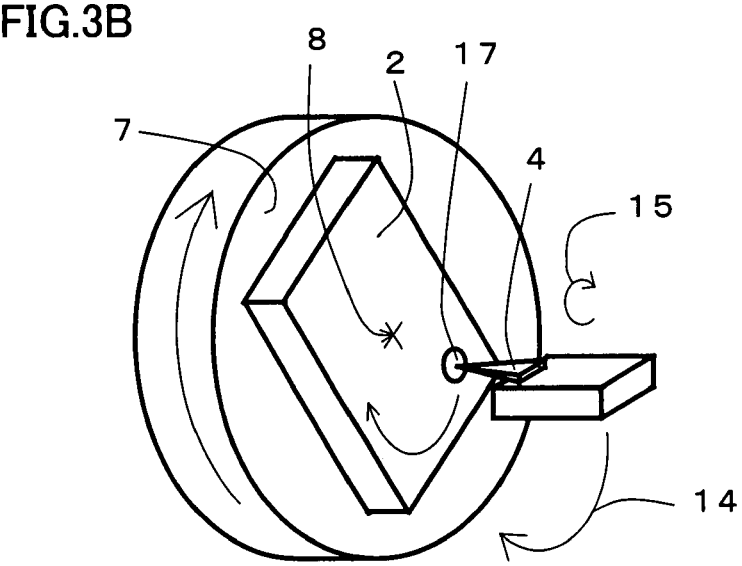
Figure 4A:
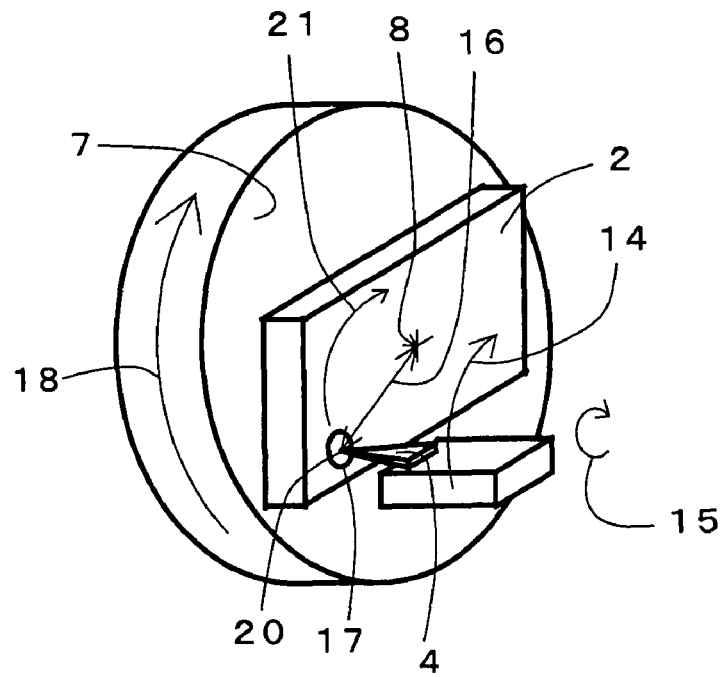
FIGS. 4A and 4B are schematic enlarged perspective views schematically showing the principal part of the apparatus shown in FIG. 1 in an enlarged manner for illustrating the state of cutting the work surface of the rotated mold material subsequently to FIGS. 3A and 3B.
Figure 4B:
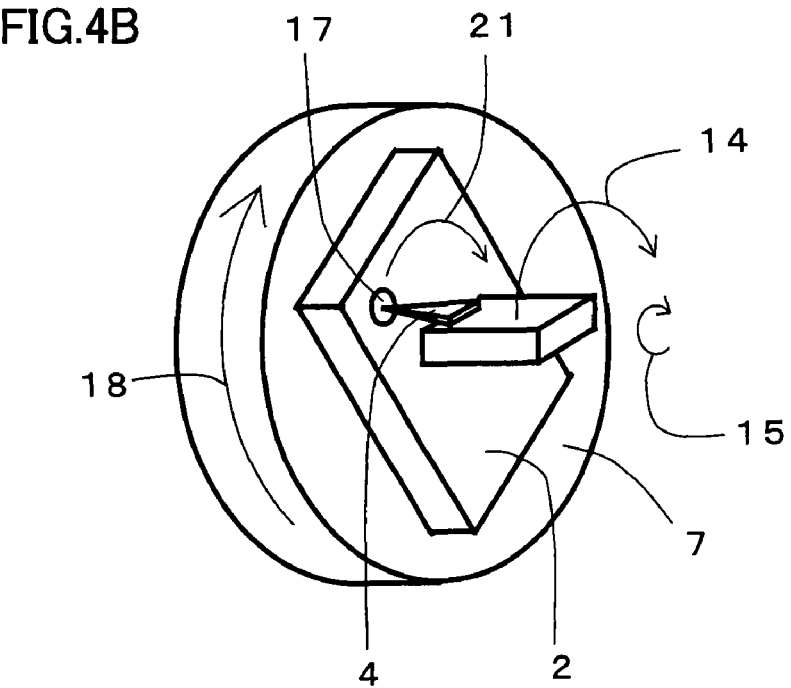

A method of working an optical component mold is now described with reference to FIGS. 3A (1), 3B (2), 4A (1) and 4B (2).

In this case, cavity 17 including the desiredly shaped opening and the desiredly shaped working surface (concave surface) is formed on desired position 20 on work surface 13 of mold material 2 mounted on mold material mount portion 7 separated from rotation center 8 by desired distance 16 at the relative desired cutting speed (vibration locus) according to the present invention by elliptical vibration cutting.

First, mold material 2 is mounted on mold material mount portion 7 provided on four-spindle lathe-type cutting/working apparatus 1 and rotated about rotation center 8 of the C-axis (in right-handed rotational direction 18 in FIG. 3A to 4B) and rotationally moved to desired position 20 (position for forming cavity 17 by cutting) at desired distance 16 from rotation center 8 of work surface 13 of mold material 2 at the desired traveling speed along locus 21.

Then, the cutting edge of cutting tool 4 is regularly set on the three-o'clock position in the opening of cut cavity 17 while cutting tool 4 is independently moved in directions X and Y respectively, thereby moving the cutting edge of cutting tool 4 at the desired traveling speed along cutting tool locus 14.

At this time, the desired cutting feed rate (moving locus) can be relatively formed between the arbitrary point in cavity 17 and cutting tool 4 by synchronously controlling cutting tool 4 to follow mold material 2 in cutting/working apparatus 1.

Then, work surface 13 (20) of mold material 2 can be elliptically vibrated/cut in cutting of cavity 17 by forming elliptical vibration locus 15 on the cutting edge of cutting tool 4.

At this time, the "desired cutting speed" by the vibration locus according to the present invention can be relatively (and sufficiently) efficiently formed between mold material 2 and cutting tool 4 by the desired cutting feed rate resulting from the desired traveling speed (desired rotational speed) of mold material 2 and the desired traveling speed of cutting tool 4 and the desired vibration speed in elliptical vibration locus 15.

Therefore, the working surface of the mold can be efficiently mirror-finished at the relative desired cutting speed (vibration locus) by cutting mold material 2 with cutting tool 4 and elliptically vibrating/cutting mold material 2.

As hereinabove described, the cutting edge of cutting tool 4 independently driven in directions X and Y respectively can be moved along arbitrary cutting tool locus 14, whereby cavity 17 including the desiredly shaped opening can be formed on desired position 20 on work surface 13 of mold material 2 separated from rotation center 8 by desired distance 16.

Further, cavity 17 including the desiredly shaped working surface can be formed by moving cutting tool 4 in direction Z, as hereinabove described.

Therefore, a cavity having a desired shape, i.e., optical component molding cavity 17 including the desiredly shaped opening and the desiredly shaped working surface (concave surface, for example) can be formed on a desired portion of work surface 13 of mold material 2 by cutting.

Further, a mold (split mold 19) having a desired number of cavities 17 (structure obtained by arranging a plurality of cavities 17 in the form of a matrix, for example) is cut by repeating the working according to the present invention for forming a desired number of cavities 17 on desired position (20) of mold material 2.

In order to work a Fresnel lens mold (optical component mold) by the aforementioned working method, the working described with reference to FIGS. 8A and 8B, for example, is performed.

Further, the control instruction described with reference to FIG. 11 can be employed as the aforementioned control instruction for working cavity 17.

In other words, neither setup time of the apparatus nor assembly time for the cavity block is necessary according to this embodiment as hereinabove described, whereby the mold can be worked in a shorter time than the prior art so that the productivity of the optical component mold can be efficiently improved.

According to this embodiment, the working surface of the mold can be mirror-finished by forming cavity 17 of the desired shape by elliptically vibrating/cutting mold material 2 at the relative desired cutting speed, whereby a high-quality working surface can be efficiently worked in the working of the optical component mold according to the present invention.

According to this embodiment, further, cavity 17 including the nonspherical working surface (concave surface) can be efficiently worked.

In order to cut a hardly cuttable material such as cemented carbide, for example, as mold material 2 in this embodiment, the cutting edge of cutting tool 4 is driven in directions X and Y along cutting tool locus 14 as the tool feed according to the present invention, as hereinabove described.

In the point cutting work surface 13 (mold material 2) and mirror-finishing the working surface, however, it may not be possible to efficiently obtain the (relatively formed) desired cutting speed (24) on cutting tool 4 with respect to mold material 2 (cut position on work surface 13) in the tool feed in cutting/working apparatus (1).

In other words, the cutting edge of cutting tool 4 is inverted on a position along direction X or Y while the hardly cuttable material (mold material 2) cut with cutting tool 4 is extremely hard, whereby it may not be possible to efficiently (sufficiently) obtain the relative desired cutting speed on cutting tool 4 in the point of formation of the relative desired cutting speed.

In the case of cutting the hardly cuttable material (mold material 2), therefore, ultrasonic elliptical vibration is further supplied to the cutting edge of cutting tool 4, so that the (relatively formed) desired cutting speed with respect to mold material 2 can be (sufficiently) efficiently obtained on cutting tool 4.

Referring to FIG. 7A, the cutting feed rate for mold material (workpiece) 2 in cutting direction A (downward in FIG. 7A) is obtained by compositing the desired traveling speeds of rotated mold material 2 and the cutting edge of cutting tool 22 (4), and the relative desired cutting speed (24) can be efficiently (sufficiently) obtained by the desired vibration speed in the direction (upward in FIG. 7A) opposite to cutting direction A in elliptical vibration locus 15 formed on cutting tool 22 (4).

According to the present invention, therefore, the "relative desired cutting speed" can be efficiently obtained by the "relative cutting feed rate resulting from traveling speed 61 or 62 (locus 21) of mold material 2 and the traveling speed (locus 14) of the cutting edge of cutting tool 4" and "vibration speed 63 of elliptical vibration locus 15" on the cut position (three-o'clock position in the cavity opening) of rotated mold material 2 (work surface 13).

In other words, cavity 17 including the desiredly shaped opening and the desiredly shaped working surface can be cut at the relative desired cutting speed (vibration locus) according to the present invention by cutting desired position 20 of rotated mold material 2 (work surface 13) and elliptically vibrating/cutting desired position 20 in this cutting, so that the working surface (desiredly shaped concave surface) of cavity 17 can be efficiently mirror-finished.

According to this embodiment, ferrous mold material 2 including soft metal, electroless nickel, cemented carbide, a tungsten alloy or hardened steel can be cut with a single-crystalline diamond tool (cutting tool 4, 22) having a sharp forward end (cutting edge), while a material hardly cuttable by ordinary cutting can be cut.

According to this embodiment, hardened steel (mold material 2) can be cut, whereby the present invention is applicable to working of an optical component mold (for an LED, for example) capable of efficiently improving productivity.

In other words, a mold (31) obtained by arranging fine cavities (17) each having a complicated shape in the form of a matrix can be worked according to this embodiment, whereby the present invention can be extended to application related to LEDs.

A tool having a V-shaped cutting edge or a rounded-corner tool having a rounded cutting edge can be employed as cutting tool 4.

Exemplary cutting data are as follows:
Mold material (workpiece): Ni—P-plated steel
Cutting tool: single-crystalline diamond tool
Speed of spindle rotation (C-axis): 0.1 to 60 rpm
Diameter of elliptical vibration locus: 1 to 10 μm
Frequency of elliptical vibration: 20 to 40 kHz
Vibration speed: 5 to 50 m/min.

Second Embodiment

A second embodiment of the present invention employing high-speed milling in place of working by elliptical vibration cutting is now described with reference to FIGS. 12A and 12B.

The basic structure of a lathe-type working apparatus 51 employed in the second embodiment is identical to that of cutting/working apparatus 1 according to the first embodiment. Therefore, identical portions are denoted by the same reference signs, and redundant description is not repeated.

(Structure of Lathe-Type Working Apparatus 51 According to Second Embodiment)

Figure 12A:
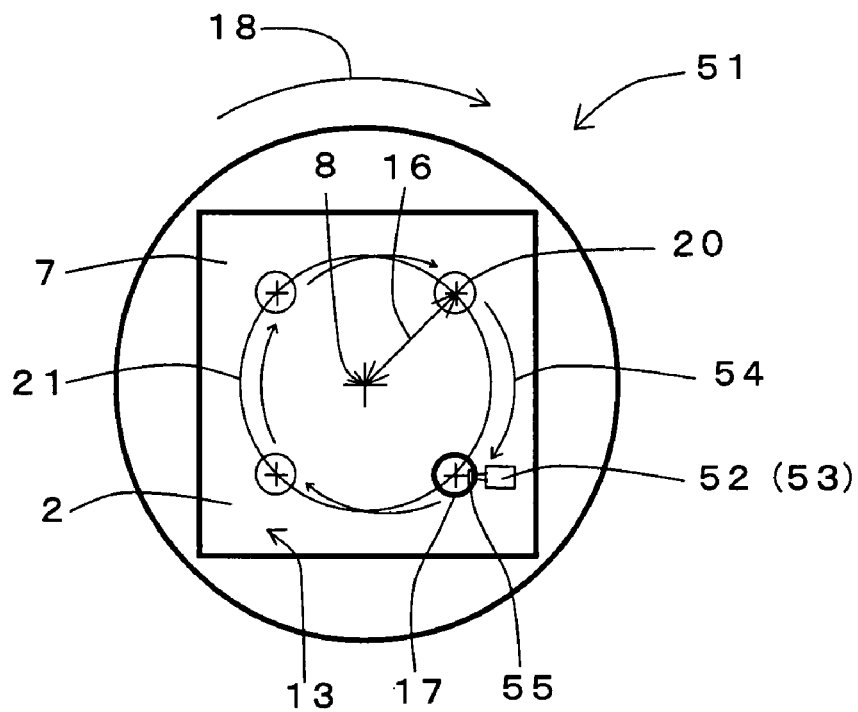
FIG. 12A is a schematic enlarged side elevational view schematically showing a mold material mounted on a mold material mount portion of an apparatus according to another embodiment of the present invention in an enlarged manner.

Lathe-type working apparatus 51 shown in FIG. 12A is provided with a mold material mount portion 7 mounted with a mold material 2 and a rotary cutting mechanism 53 having a rotary cutting tool 52 for high-speed milling.

According to the second embodiment, a rotary blade 55 provided on the forward end of rotary cutting tool 52 is employed in place of the vibration speed of elliptical vibration locus 14 according to the first embodiment, and rotary blade 55 is rotated at a desired rotational speed (along a desired rotation locus).

In lathe-type working apparatus 51, mold material 2 (cut position) mounted on mold material mount portion 7 can be rotated in a right-handed rotational direction 18 about the C-axis serving as the core (rotation center 8), similarly to cutting/working apparatus 1 according to the first embodiment.

Rotary cutting tool 52 for high-speed milling is independently driven in directions X and Y respectively, to be movable along a locus 54 in a state rotated in a rotational direction 56.

According to the second embodiment, a cavity 17 including a desiredly shaped opening and a desiredly shaped working surface (concave surface) is formed on a desired position 20 at a desired distance 16 from rotation center 8 on work surface 13 of rotated mold material 2 by cutting, similarly to the first embodiment.

According to the second embodiment, desired position 20 rotationally moves along a locus 21 due to the rotation about rotation center 8, while rotary blade 55 of rotary cutting tool 52 is located on the three-o'clock position in the opening of cavity 17 and controlled to be approximated to or separated from the central position (desired position 20) of the opening of cavity 17 (see locus 54), for example, similarly to the first embodiment.

In other words, rotary cutting tool 52 is rotated at a high speed for cutting mold material (workpiece) 2 at a high speed by the aforementioned milling.

According to the aforementioned milling, cutter paths are finely set on the workpiece (2), so that the workpiece (2) can be worked into a desired shape with small cutting force by rotating small-diametral rotary cutting tool (54) along the cutter paths at a high speed (by rapid feed).

Therefore, the working surface formed by high-speed cutting with rotary cutting tool 52 can be efficiently mirror-finished.

In the aforementioned high-speed cutting, the diameter of rotary cutting tool 52 and the depth of cut in the axial direction are set to small values with respect to workpiece 2 in order to stably cut workpiece (mold material) 2 with small cutting force, so that the working surface of workpiece 2 can be efficiently mirror-finished.

According to the second embodiment, therefore, the productivity of an optical component mold can be efficiently improved while a high-quality working surface can be efficiently worked in working of the optical component mold, similarly to the first embodiment.

According to the second embodiment, further, cavity 17 having the desiredly shaped opening and a nonspherical working surface can be efficiently worked, similarly to the first embodiment.

In relation to the rotation of rotary blade 55, mold material 2 (work surface 13) can be subjected to fly cutting (in other words, up cut milling or down cut milling), for example.

Figure 12B:
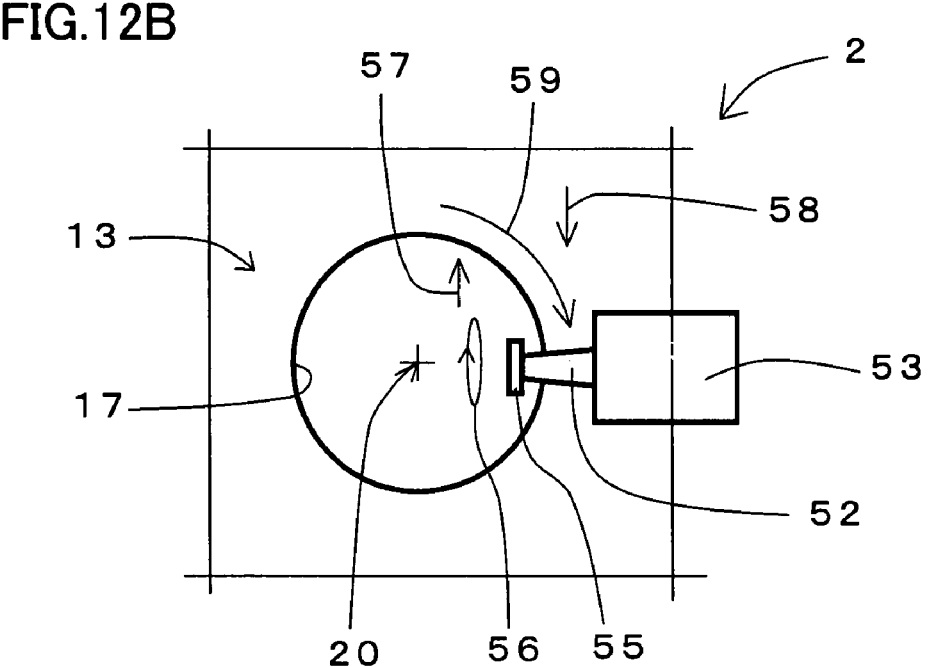
FIG. 12B is a schematic enlarged side elevational view schematically showing a principal part of the mold material shown in FIG. 12A in a more enlarged manner.
Figure 13A:
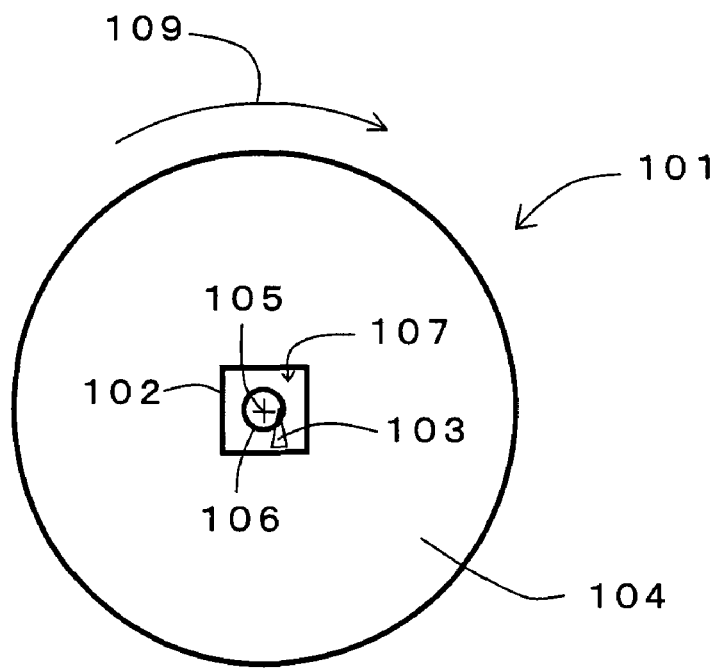
FIG. 13A is a schematic enlarged side elevational view schematically showing a mold material mounted on a mold material mount portion of a conventional four-spindle lathe-type cutting/working apparatus in an enlarged manner.
Figure 13B:
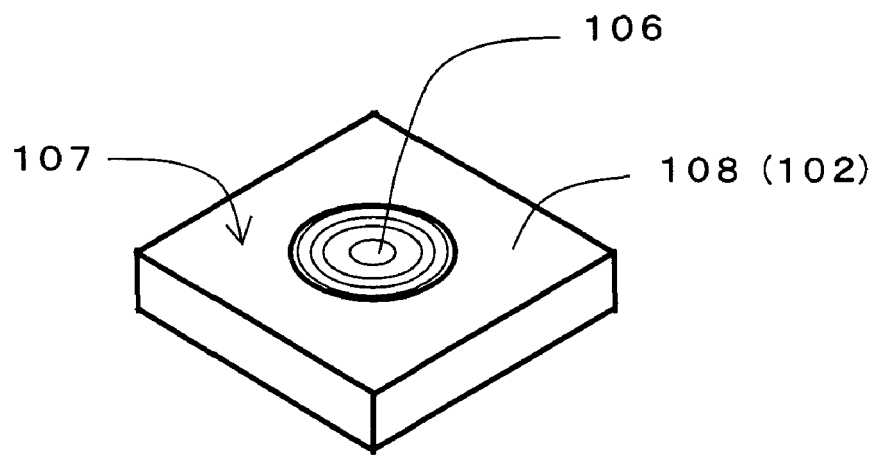
FIG. 13B is a schematic enlarged perspective view schematically showing the mold material shown in FIG. 13A in an enlarged manner.

In other words, mold material 2 is rotated clockwise so that an arbitrary point in the opening of cavity 17 is moved in the clockwise (rotational) direction at a desired traveling speed of this opening, as shown in FIG. 12B (see arrow 59).

Therefore, mold material 2 (cut position) is moved downward (along arrow 58) in FIG. 12B on desired position 20 (cut position) in the opening of cavity 17, as shown in FIG. 12B.

Further, rotary cutting tool 52 is moved along rotary cutting tool locus 54 at the desired traveling speed, similarly to locus 14 of cutting tool 4 according to the first embodiment.

Therefore, a relative desired cutting speed (moving locus) can be efficiently obtained by desired traveling speeds 58 and 59 in mold material 2 and the desired rotational speed (locus 54) in the rotary blade 55, similarly to the first embodiment.

Further, the "desired cutting speed (rotation locus)" according to the present invention can be relatively formed by the relative cutting feed rate resulting from the desired traveling speeds of mold material 2 and rotary cutting tool 52 and the desired rotational speed in rotary blade 55, similarly to the first embodiment.

The relation between the direction of cutting in the direction of rotation (rotation locus) of rotary blade 55 on the three-o'clock position of mold material mount portion 7 (mold material 2) and the direction of movement of mold material 2 also applies to another position such as the 0-, six-or nine-o'clock position of mold material mount portion 7 (mold material 2), for example.

The structure according to the second embodiment effectively acts on a hardly cuttable material, similarly to the first embodiment.

(Method of Working Optical Component Mold According to Second Embodiment)

The working method according to the second embodiment is now described with reference to FIGS. 12A and 12B.

According to the second embodiment, mold material 2 is mounted on mold material mount portion 7 provided on lathe-type working apparatus 51 and rotated (counterclockwise 18 in FIG. 12A) about rotation center 8 of the C-axis while desired position 20 (position for forming cavity 17 by cutting) of work surface 13 of mold material 2 at desired distance 16 from rotation center 8 is rotated/moved along locus 21, similarly to the first embodiment.

Then, rotary cutting tool 52 of lathe-type working apparatus 51 is independently moved in directions X and Y respectively, so that rotary cutting tool 52 of rotary cutting mechanism 53 is moved along rotary cutting tool locus 54 such as a spiral locus, for example.

In other words, the desired cutting feed rate (moving locus) can be relatively formed between mold material 2 and rotary cutting tool 52 of rotary cutting mechanism 53 by synchronously controlling rotary cutting tool 52 of rotary cutting mechanism 53 to follow mold material 2 in lathe-type working apparatus 51.

At this time, rotary blade 55 of cutting tool 52 of lathe-type working apparatus 51 is regularly set on the three-o'clock position in the opening of cavity 17.

At this time, further, the "desired cutting speed (rotation locus)" according to the present invention can be relatively formed by the relative cutting feed rate resulting from the desired traveling speeds of mold material 2 and rotary cutting tool 52 and the desired rotational speed in rotary blade 55.

Therefore, desired position 20 of work surface 13 of mold material 2 can be cut by high-speed milling at the relatively formed desired cutting speed (rotation locus) according to the present invention with rotary cutting tool 52 of rotary cutting mechanism 53.

At this time, cutting in the direction of depth of cut from work surface 13 of mold material 2 is performed by moving mold material 2 in direction Z, similarly to the first embodiment.

Therefore, high-speed milling is performed on work surface 13 of mold material 2 as described above, whereby cavity 17 including the desiredly shaped opening and the desiredly shaped working surface (concave surface) such as a non-spherical working surface, for example, can be formed on desired position 20 of work surface 13.

Further, a split mold 19 (optical component mold or structure) can be obtained by forming a desired number of cavities 17 in work surface 13 of mold material 2 by repeating the working of forming cavity 17 on desired position 20.

According to the second embodiment, therefore, functions/effects similar to those of the first embodiment can be attained.

In other words, the mold can be worked in a shorter time than the prior art according to the second embodiment similarly to the first embodiment, whereby the productivity of the optical component mold (structure) can be efficiently improved.

According to the second embodiment, the working surface of cavity 17 can be mirror-finished by performing high-speed milling at the relatively formed desired cutting speed according to the present invention similarly to the first embodiment, whereby a high-quality working surface can be efficiently worked in working of the optical component mold according to the present invention.

According to the second embodiment, further, cavity 17 including the desiredly shaped opening and the nonspherical working surface can be efficiently worked similarly to the first embodiment.

In the working method according to each of the aforementioned embodiments, a mold (split mold) can be formed by arranging microlens cavities on a mold material in the form of a matrix.

While cutting tool 4 and rotary blade 55 are employed in the aforementioned embodiments, a grinding tool may alternatively be employed in the present invention.

While the optical component mold is employed as the structure in each of the aforementioned embodiments, a metal component reflecting light, for example, can be formed by working a metallic material (workpiece).

While the four-spindle working apparatus having the X-, Y-, Z- and C-axes is employed in each of the aforementioned embodiments, a five-spindle working apparatus may alternatively be employed along with an additional B-axis rotated about the Y-axis in the present invention.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of working a structure with a working apparatus at least having three rectilinear drive spindles orthogonal to each other and a rotary spindle rotationally driving a workpiece by cutting said workpiece in a state rotated about a C-axis employed as the axis of rotation with a cutting tool driven in directions X and Y while relatively adjusting a desired depth of cut with respect to said workpiece in a direction Z thereby forming a cavity of a desired shape in said workpiece, comprising the steps of:

driving said cutting tool in said directions X and Y and synchronously rotating said cutting tool in the same rotational direction as said C-axis rotation; and cutting a desired position of said workpiece with said cutting tool thereby forming said cavity of said desired shape in said workpiece, wherein said step of cutting said desired position of said workpiece with said cutting tool includes the step of generating elliptical vibration on the cutting edge of said cutting tool thereby elliptically vibrating/cutting and working said workpiece at a relative desired cutting speed.

2. The method of working a structure according to claim 1, relatively forming said desired cutting speed by a relative cutting feed rate resulting from the traveling speeds of said workpiece and said cutting tool and the vibration speed of the locus of said elliptical vibration in said step of cutting said desired position of said workpiece with said cutting tool.

3. The method of working a structure according to claim 1, arranging the cutting edge of said cutting tool on the three-o'clock position in an opening of a molding cavity formed with said cutting tool in said step of cutting said desired position of said workpiece with said cutting tool.

4. A method of working a structure with a working apparatus at least having three rectilinear drive spindles orthogonal to each other and a rotary spindle rotationally driving a workpiece by cutting said workpiece in a state rotated about a C-axis employed as the axis of rotation with a cutting tool driven in directions X and Y while relatively adjusting a desired depth of cut with respect to said workpiece in a direction Z thereby forming a cavity of a desired shape in said workpiece, comprising the steps of:

driving said cutting tool in said directions X and Y and synchronously rotating said cutting tool in the same rotational direction as said C-axis rotation;

cutting a desired position of said workpiece with said cutting tool thereby foiming said cavity of said desired shape in said workpiece; and high-speed-milling said workpiece at a relative desired cutting speed in said step of cutting said desired position of said workpiece with said cutting tool.

5. The method of working a structure according to claim 4, relatively forming said desired cutting speed by a relative cutting feed rate resulting from the traveling speeds of said workpiece and rotated said cutting tool and the rotational speed of a rotary blade in said step of cutting said desired position of said workpiece with said cutting tool.

6. The method of working a structure according to claim 4, arranging the cutting edge of said cutting tool in the three-o'clock direction in an opening of a molding cavity formed with said cutting tool in said step of cutting said desired position of said workpiece with said cutting tool.

7. An apparatus for working a structure, comprising:
three rectilinear drive spindles orthogonal to each other;
a rotary spindle rotationally driving a workpiece about a C-axis;
a cutting tool driven in directions X and Y parallel to a surface to be processed of said workpiece where the surface to be processed is orthogonal to said C-axis, while relatively adjusting a desired depth of cut with respect to said workpiece in a direction Z parallel to said C-axis; and
control means for driving said cutting tool in said directions X and Y and synchronously rotating said cutting tool in the same rotational direction as said C-axis such that said cutting tool follows a portion to be processed of said workpiece, wherein
said cutting tool is provided with an elliptical vibration generating portion generating a locus of elliptical vibration.

8. An apparatus for working a structure, comprising:
three rectilinear drive spindles orthogonal to each other;
a rotary spindle rotationally driving a workpiece about a C-axis;
a cutting tool driven in directions X and Y parallel to a surface to be processed of said workpiece where the surface to be processed is orthogonal to said C-axis, while relatively adjusting a desired depth of cut with respect to said workpiece in a direction Z parallel to said C-axis; and
control means for driving said cutting tool in said directions X and Y and synchronously rotating said cutting tool in the same rotational direction as said C-axis such that said cutting tool follows a portion to be processed of said workpiece, wherein
a rotary cutting tool for high-speed milling is provided as said cutting tool.

9. A method of working a structure with a working apparatus at least having three rectilinear drive spindles orthogonal to each other and a rotary spindle rotationally driving a workpiece by cutting said workpiece in a state rotated about a C-axis employed as the axis of rotation with a cutting tool driven in directions X and Y orthogonal to each other and parallel to a surface to be processed of said workpiece where the surface to be processed is orthogonal to said C-axis, while relatively adjusting a desired depth of cut with respect to said workpiece in a direction Z parallel to said C-axis, thereby forming a cavity of a desired shape in said surface to be processed of said workpiece, comprising the steps of:

driving said cutting tool in said directions X and Y and synchronously rotating said cutting tool in the same rotational direction as said C-axis rotation such that said cutting tool follows a portion to be processed of said workpiece; and cutting said portion to be processed of said workpiece with said cutting tool thereby forming said cavity of said desired shape in said workpiece, wherein said step of cutting said portion to be processed of said workpiece with said cutting tool includes the step of generating elliptical vibration on the cutting edge of said cutting tool thereby elliptically vibrating/cutting and working said workpiece at a relative desired cutting speed.

10. The method of working a structure according to claim 9, relatively forming said desired cutting speed by a relative cutting feed rate resulting from the traveling speeds of said workpiece and said cutting tool and the vibration speed of the locus of said elliptical vibration in said step of cutting said portion to be processed of said workpiece with said cutting tool.

11. The method of working a structure according to claim 9, arranging the cutting edge of said cutting tool on the three-o'clock position in an opening of a molding cavity formed with said cutting tool in said step of cutting said portion to be processed of said workpiece with said cutting tool.

12. A method of working a structure with a working apparatus at least having three rectilinear drive spindles orthogonal to each other and a rotary spindle rotationally driving a workpiece by cutting said workpiece in a state rotated about a C-axis employed as the axis of rotation with a cutting tool driven in directions X and Y orthogonal to each other and parallel to a surface to be processed of said workpiece where the surface to be processed is orthogonal to said C-axis, while relatively adjusting a desired depth of cut with respect to said workpiece in a direction Z parallel to said C-axis thereby forming a cavity of a desired shape in said surface to be processed of said workpiece, comprising the steps of:

driving said cutting tool in said directions X and Y and synchronously rotating said cutting tool in the same rotational direction as said C-axis rotation such that said cutting tool follows a portion to be processed of said workpiece;

cutting said portion to be processed of said workpiece with said cutting tool thereby forming said cavity of said desired shape in said workpiece; and high-speed-milling said workpiece at a relative desired cutting speed in said step of cutting said portion to be processed of said workpiece with said cutting tool.

13. The method of working a structure according to claim 12, relatively forming said desired cutting speed by a relative cutting feed rate resulting from the traveling speeds of said workpiece and said rotated cutting tool and the rotational speed of a rotary blade in said step of cutting said portion to be processed of said workpiece with said cutting tool.

14. The method of working a structure according to claim 12, arranging the cutting edge of said cutting tool in the three-o'clock direction in an opening of a molding cavity formed with said cutting tool in said step of cutting said portion to be processed of said workpiece with said cutting tool.

* * * * *